(12) United States Patent
Schroeder et al.

(10) Patent No.: US 9,135,131 B2
(45) Date of Patent: Sep. 15, 2015

(54) CUSTOMIZING OPERATION OF A TEST INSTRUMENT BASED ON INFORMATION FROM A SYSTEM UNDER TEST

(75) Inventors: Charles G. Schroeder, Cedar Park, TX (US); Christopher F. Graf, Liberty Hill, TX (US); Ciro T. Nishiguchi, Austin, TX (US); Nigel G. D'Souza, Austin, TX (US); Daniel J. Baker, West Lafayette, IN (US); Thomas D. Magruder, Austin, TX (US)

(73) Assignee: National Instruments Corporation, Austin, TX (US)

( * ) Notice: Subject to any disclaimer, the term of this patent is extended or adjusted under 35 U.S.C. 154(b) by 718 days.

(21) Appl. No.: 13/398,529

(22) Filed: Feb. 16, 2012

(65) Prior Publication Data

US 2013/0218509 A1 Aug. 22, 2013

(51) Int. Cl.
*G06F 11/00* (2006.01)
*G06F 11/263* (2006.01)
*G06F 11/30* (2006.01)

(52) U.S. Cl.
CPC .................................. *G06F 11/263* (2013.01)

(58) Field of Classification Search
CPC ...................................................... G06F 11/263
USPC ............................................... 702/123–125
See application file for complete search history.

(56) References Cited

U.S. PATENT DOCUMENTS

| 4,839,578 | A | 6/1989 | Roos |
| 5,059,892 | A | 10/1991 | Stoft |
| 5,309,556 | A | 5/1994 | Sismilich |
| 5,497,498 | A | 3/1996 | Taylor |
| 5,535,342 | A | 7/1996 | Taylor |
| 5,541,849 | A | 7/1996 | Rostoker et al. |

(Continued)

FOREIGN PATENT DOCUMENTS

| WO | 94 10627 | 5/1994 |
| WO | 94 15311 | 7/1994 |

OTHER PUBLICATIONS

Chen et al., "Software Environment for WASMII: A Data Driven Machine with a Virtual Hardware," Field Programmable Logic Architectures, Synthesis and Applications, 4.sup.th International Workshop on Field-Programmable Logic and Applications, FPL '94 Proceedings, Berlin, Germany, 1994; pp. 208-219.

(Continued)

*Primary Examiner* — Phuong Huynh
(74) *Attorney, Agent, or Firm* — Meyertons Hood Kivlin Kowert & Goetzel, P.C.; Jeffrey C. Hood; Joel L. Stevens

(57) ABSTRACT

Customizing a test instrument. A plurality of pairs of code modules may be provided. Each pair of code modules may include a first code module having program instructions for execution by a processor of the test instrument and a second code module for implementation on a programmable hardware element of the test instrument. For each pair of code modules, the first code module and the second code module may collectively implement a function in the test instrument. User input may be received specifying modification of a second code module of at least one of the plurality of pairs of code modules. Accordingly, a hardware description may be generated for the programmable hardware element of the test instrument based on the modified second code module.

22 Claims, 28 Drawing Sheets

(56) References Cited

U.S. PATENT DOCUMENTS

| | | |
|---|---|---|
| 5,555,201 A | 9/1996 | Dangelo et al. |
| 5,583,749 A | 12/1996 | Tredennick et al. |
| 5,603,043 A | 2/1997 | Taylor et al. |
| 5,638,299 A | 6/1997 | Miller |
| 5,652,875 A | 7/1997 | Taylor |
| 5,684,980 A | 11/1997 | Casselman |
| 5,732,277 A | 3/1998 | Kodosky et al. |
| 5,737,235 A | 4/1998 | Kean et al. |
| 5,963,454 A | 10/1999 | Dockser et al. |
| 6,064,409 A | 5/2000 | Thomsen et al. |
| 6,120,549 A | 9/2000 | Goslin et al. |
| 6,219,628 B1 | 4/2001 | Kodosky et al. |
| 6,226,776 B1 | 5/2001 | Panchul et al. |
| 6,230,307 B1 | 5/2001 | Davis et al. |
| 6,784,903 B2 | 8/2004 | Kodosky et al. |
| 6,885,185 B1 | 4/2005 | Makinson et al. |
| 6,964,198 B2 | 11/2005 | Eisenhower, Jr. |
| 7,028,222 B2 | 4/2006 | Peterson et al. |
| 7,085,670 B2 | 8/2006 | Odom et al. |
| 7,542,867 B2 | 6/2009 | Steger et al. |
| 7,548,828 B2 | 6/2009 | Gil et al. |
| 7,915,909 B2 | 3/2011 | Dunn et al. |
| 2006/0015862 A1* | 1/2006 | Odom et al. ............ 717/168 |

OTHER PUBLICATIONS

Edwards et al., "Software acceleration using programmable hardware devices," IEEE Proceedings: Computers and Digital Techniques, vol. 143, No. 1, Jan. 1996, pp. 55-63.

Leeser et al, "High Level Synthesis and Generating FPGAs with the BEDROC System," Journal of VLSI Signal Processing, vol. 6, No. 2, Aug. 1993, pp. 191-214.

International Search Report for PCT/US 98/13040 mailed Dec. 22, 1998, pp. 1-7.

Ade, M; Lauwereins, R; Peperstraete, J.A.; Hardware-Software Codesign with Grape, Proceedings of the Sixth IEEE International Workshop on Rapid System Prototyping, pp. 40-47, Jun. 9, 1995.

Lauwereins, R; Engels, M; Ade, M; Peperstraette, J; Grape-II: A System-Level Prototyping Environment for DSP Applications, Computer, vol. 28, Issue 2, pp. 35-43, Feb. 1995.

Lysaght, P; Stockwood, J; "A Simulation Tool for Dynamically Reconfigurable Field Programmable Gate Arrays", IEEE Transactions on Very Large Scale Integration Systems, vol. 4, Issue 3, pp. 381-390, Sep. 1996.

De Coster, Grape-II: An Introduction [online]. Automatic Control and Computer Architectures Department. Katholieke Universiteit Leuven, Belgium, Feb. 22, 1996 [retrieved Oct. 6, 1999] Retrieved from the Internet @ http://www.esat.kuleuven.ac.be/acca; pp. 1-25.

Wenban, Alan; Brown, Geoffrey; "A Software Development System for FPGA-based Data Acquisition Systems", Proceedings of the IEEE Symposium on FPGAs for Custom Computing Machines, pp. 28-37, Apr. 1996.

Petronino et al., "An FPGA-based Data Acquisition System for a 95 GHz. W-band Radar", IEEE International Conference on Acoustics, Soeech and Signal Processing, vol. 5, pp. 4105-4108, Apr. 1997.

Boulay et al., "A High Throughput Controller for a 256-Channel Cardiac Potential Overlapping System", Canadian Conference on Electrical and Computer Engineering, vol. 1, pp. 539-542, Sep. 1995.

Collamati et al. "Induction Machine stator Fault On-line Diagnosis Based on LabVIEW Environment", Mediterranean Electrotechnical Conference, vol. 1, p. 495-498, May 1996.

Spoelder et al., "Virtual Instrumentation: A Survey of Standards and Their Interrelation", Proc. IEEE Instr. and Measurement Tech. Conf., vol. 1, pp. 676-681, May 1997.

Srinivasan et al., "LabVIEW program Design for On-Line Data Acquisition and Predictive Maintenance", Proc. Of the 30th Southeastern Symp. On System Theory, pp. 520-524, Mar. 1998.

Wahidanabanu et al., "Virtual Instrumentation with Graphical Programming for Enhanced Detection and Monitoring of Partial Discharges", Proc. Electrical Insulation Conf. 1997, pp. 291-296, Sep. 1997.

International Search Report for Application No. PCT/US2013/026393, mailed Jul. 30, 2013; 4 pages.

* cited by examiner

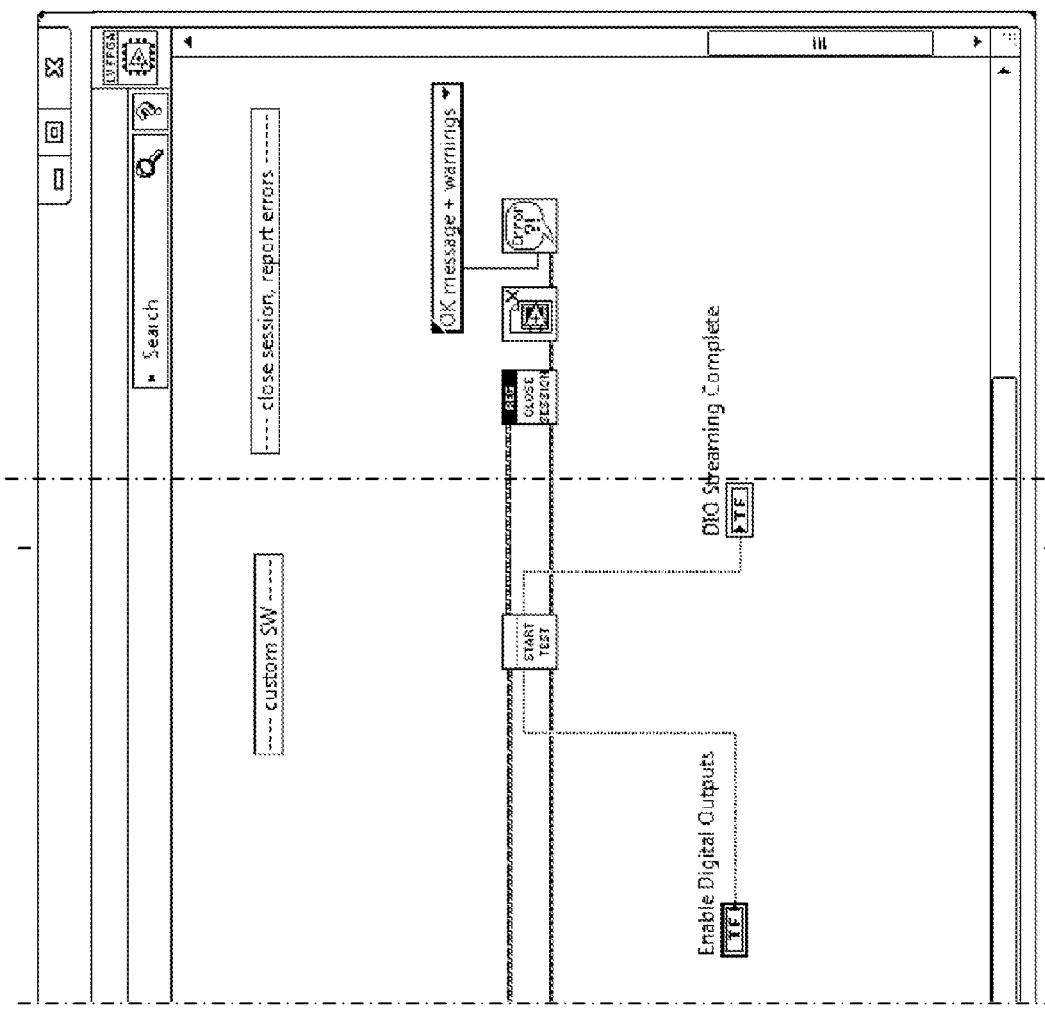

CUSTOMIZING OPERATION OF A TEST INSTRUMENT BASED ON INFORMATION FROM A SYSTEM UNDER TEST

FIELD OF THE INVENTION

The present invention relates to test instruments, and more particularly to a system and method for customizing software and programmable hardware of test instruments.

DESCRIPTION OF THE RELATED ART

Test instruments are generally used to for performing testing of devices under test (DUTs) or systems under test (SUTs). Test instruments generally include one or more inputs and outputs for connecting to SUTs. The inputs and outputs may be analog, digital, radio frequency, etc., e.g., at various voltage levels and frequencies. Test instruments are generally able to perform one or more tests or features. For example, test instruments may be configured to capture waveforms, calculate measured power, generate a tone at a programmed frequency, etc. Test instruments are also typically calibrated in order to achieve a specified level of accuracy on its I/O. For example, when the device is requested to generate a sinewave at 1V peak-peak, it may do so with +/−10 mV of accuracy. Finally, test instruments usually include a user interface in order to specify how the test instrument should behave.

Currently, test instruments may be used or configured in a variety of manners. For example, users may purchase test instruments which have fixed software and firmware (e.g., implemented on a programmable hardware element). The software and firmware may interact with underlying physical hardware of the test instrument, such as analog-to-digital converters (ADCs), digital to analog converters (DACs), etc. This model is shown in FIG. 1

As another example, some test instruments may be configured to be programmed in a completely custom manner, where a user may provide custom code for a processor and for a programmable hardware element of the test instrument. This custom code may interact with similar underlying physical hardware as in the previous example. This model is shown in FIG. 2.

In the first case, the user is not able to customize any of the functionality of the test instrument. Further, the user may be forced to purchase features that are never used, e.g., buying a test instrument with a large set of features in order to use only a few of them. Accordingly, these users are forced to adapt their testing to the provided fixed functionality and may not need other features provided by the test instrument. In the second case, the user is forced to completely specify the functionality of the test instrument, which may require a tremendous amount of coding and test instrumentation knowledge. Additionally, the requirement of providing all of this code may be extremely cost inefficient.

Thus, both examples of test instruments result in a poor user experience. Accordingly, improvements in test instruments, especially in customization, are desired.

SUMMARY OF THE INVENTION

Various embodiments of a system and method for customizing software and hardware of test instruments are presented below.

A plurality of pairs of code modules may be provided, e.g., within a development environment for configuring or programming the test instrument. Each pair of code modules may include a processor-side code module having program instructions for execution by a processor of the test instrument and a programmable hardware element (PHE)-side code module for implementation on a programmable hardware element of the test instrument. In one embodiment, in each pair, the processor-side code module and the PHE-side code module may collectively implement a function in the test instrument. For example, the processor-side code module may be executable by the processor to perform a first portion of a function, and the PHE-side code module may be configured to be implemented on the programmable hardware element to perform a corresponding second portion of the function.

The pairs of code may provide various features, e.g., those typically associated with a test instrument, including functionality associated with hardware configuration, digital signal processing, acquisition, generation, or synchronization, among other possibilities. Additionally, the programmable hardware element may interact with underlying hardware of the test instrument, such as analog to digital converters (ADCs), digital to analog converters (DACs), digital input and output, center frequency (e.g., clocking hardware and/or local oscillators), power level (e.g., analog gain and/or attenuation hardware), among other possibilities.

In one embodiment, the code modules may be provided within a graphical programming development environment. For example, the code modules may be included in one or more graphical programs having a plurality of nodes connected by wires. The interconnected nodes may visually represent functionality of the one or more graphical program portions.

User input may be received which specifies modification of code of one or more code module pairs. For example, the user input may modify the processor-side code module and/or the PHE-side code module of one or a plurality of code module pairs. In some embodiments, a portion of the PHE-side code modules may be fixed, i.e., they may not be changed by the user, e.g., during customization. Where the code modules include graphical program code, the user input may specify customization of the graphical program code, e.g., the user may modify the nodes and/or connections between the nodes to customize the behavior of the test instrument. Further, an application programming interface (API) may be provided for interacting with the plurality of pairs of code modules. In some embodiments, this API may remain unchanged and usable after said receiving user input.

The customization or modification of the code modules may include a variety of actions. For example, the user may remove portions or all of one or more of the code modules. Additionally, or alternatively, the user may add additional functionality to one or more code modules, as desired. The user may also add functionality outside of the code modules (e.g., which is coupled to the code modules) In one particular embodiment, the customization may specify adaptive behavior for the test instrument, e.g., such that it may dynamically adjust operation of the test instrument in response to signals from the test system (e.g., based on a characteristic of received signals, content of received signals, etc.).

Finally, the test instrument may be configured with the code modules. This configuration may include generating a hardware description for the programmable hardware element of the test instrument based on the second code modules (e.g., including any modifications specified by the user input). Similarly, the configuration may include storing the first code modules on one or more memory mediums of the test instrument, e.g., for execution by processor(s) of the test instrument, including any modification specified by the user input.

BRIEF DESCRIPTION OF THE DRAWINGS

A better understanding of the present invention can be obtained when the following detailed description of the preferred embodiment is considered in conjunction with the following drawings, in which.

Figure 1:
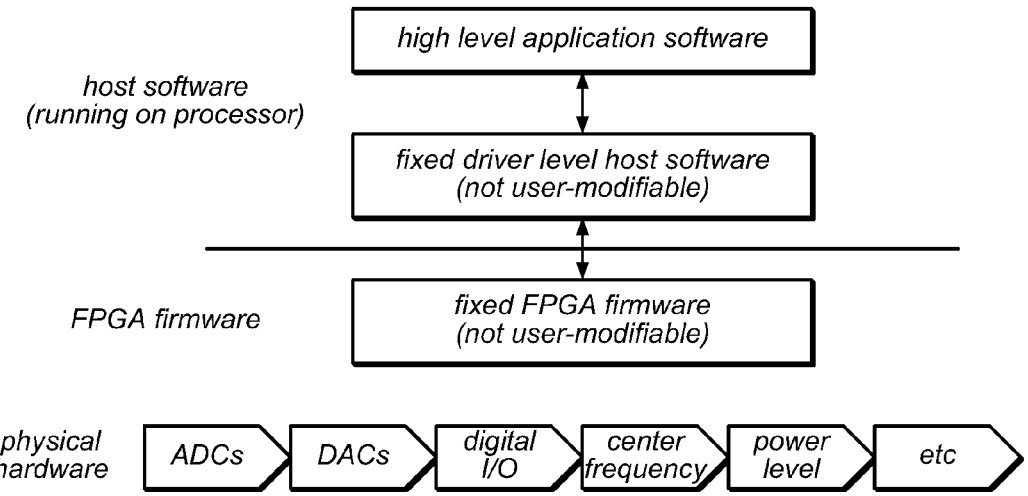
FIGS. 1 and 2 illustrate block diagrams of prior art test instrument configuration models.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/System-Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 3A:
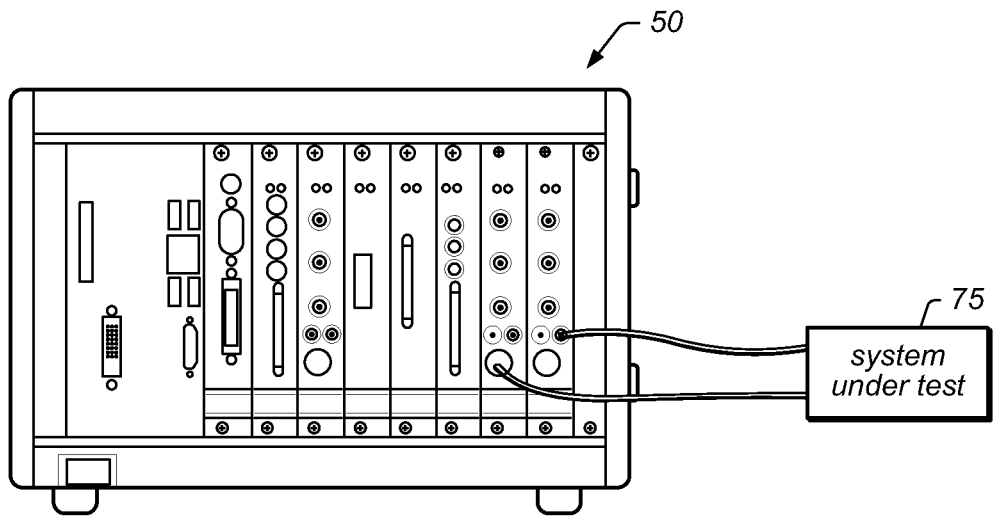
FIGS. 3A-3C illustrate exemplary systems for implementing various embodiments.
Figure 3B:
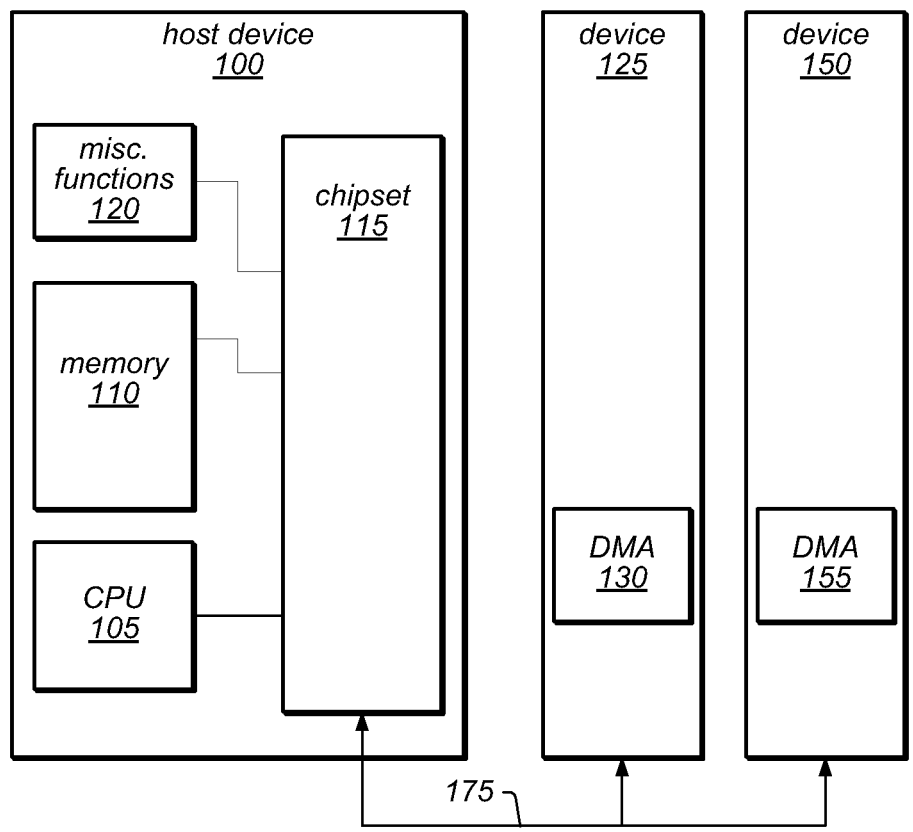
Figure 3C:
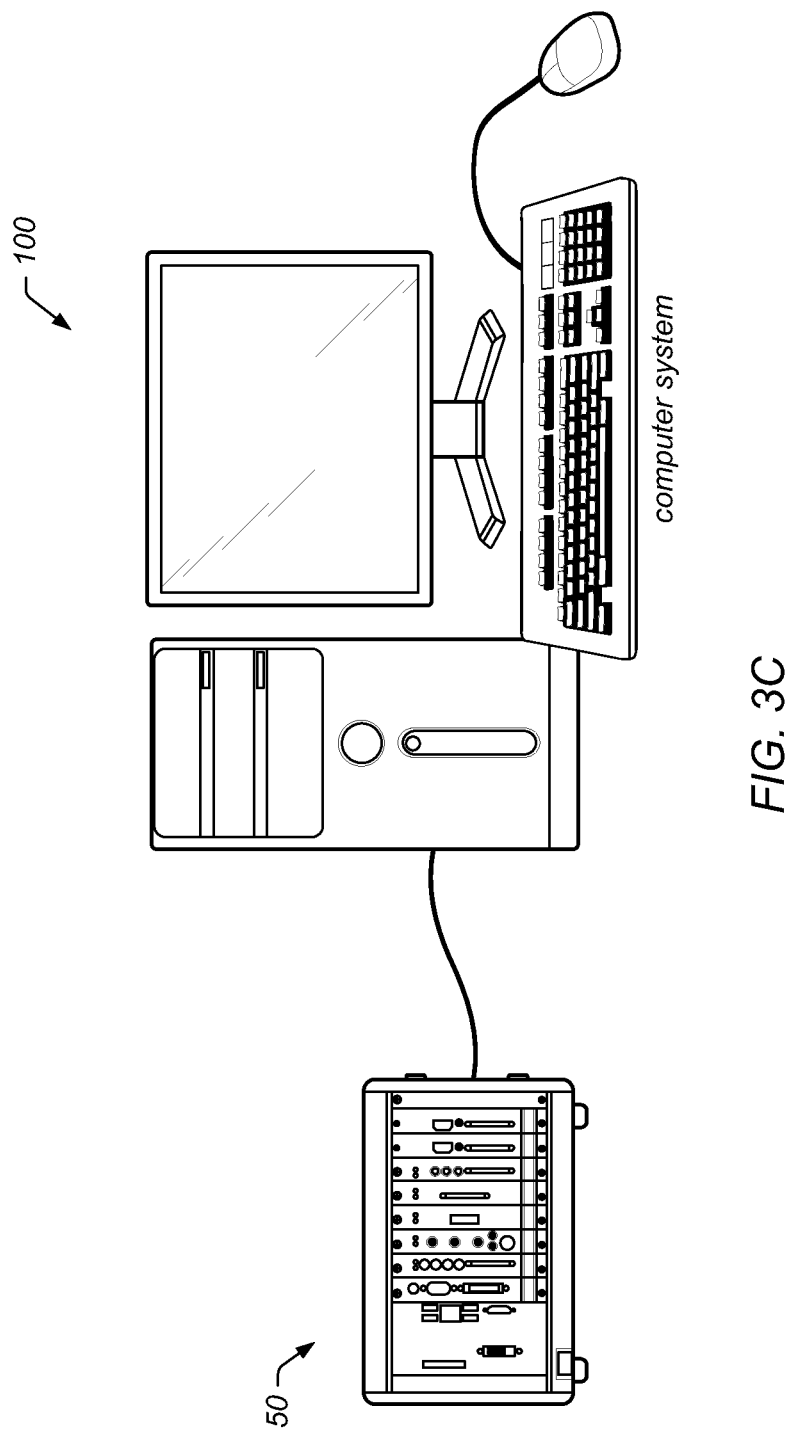

FIGS. 3A-3C—Exemplary Systems

FIGS. 3A-3C illustrate exemplary systems which may implement embodiments described herein. As shown in FIG. 3A, an exemplary test instrument 50 (also referred to as an "instrumentation device" or "testing device") is coupled to a system under test (SUT) 75. As used herein, an SUT covers the term "device under test" or "DUT". In the embodiment of FIG. 3A, the test instrument 50 is implemented as a chassis which is configured or operated to test the SUT 75.

The test instrument 75 may include one or more inputs and outputs for connecting to the SUT 75. The inputs and outputs may be analog, digital, radio frequency, etc., e.g., at various voltage levels and frequencies. The test instrument 75 may be configured to perform one or more tests or may implement various features for performing testing of the SUT 75. For example, the test instrument 50 may be configured to capture waveforms, calculate measured power, generate a tone at a programmed frequency, etc. The test instrument 50 may be calibrated in order to achieve a specified level of accuracy on its input/output (I/O). For example, the test instrument 50 may be configured to generate a sine wave at 1V peak-peak, within +/−10 mV of accuracy. The test instrument 50 may be configured and/or may operate in the manner described herein.

The SUT 75 may be any of various devices or systems which may be desired to be tested, such as a various radio frequency (RF) devices, semiconductor integrated circuits, consumer electronics, wireless communication devices (such as cell phones), computers, automobile electronics, energy devices, measurement devices, etc. In one embodiment, the test instrument 50 may be configured to perform various testing of the SUT 75, e.g., on signals acquired from the SUT 75. In one embodiment, the chassis may acquire measurements of the SUT 75, such as current, voltage, etc., e.g., using analog sensors, and/or digital signals using digital I/O.

FIGS. 3B illustrates an exemplary block diagram of one embodiment of the test instrument 50. As shown, the test instrument 50 may include a host device 100 (e.g., a host controller board), which may include a CPU 105, memory 110, and chipset 115. Other functions that may be found on the host device 100 are represented by the miscellaneous functions block 120. In some embodiments, the host device 100 may include a processor and memory (as shown) and/or may include a programmable hardware element (e.g., a field programmable gate array (FPGA)). Additionally, one or more of the cards or devices (e.g., device 125 and/or 150) may also include a programmable hardware element. In further embodiments, a backplane of the test instrument 50 may include a programmable hardware element. In embodiments including a programmable hardware element, it may be configured according to a graphical program as described in the various patents incorporated by reference above.

As shown, the host device 100 (e.g., the chipset 115 of the host device 100) may provide communication (e.g., PCIe communication, PXI communication, or other bus communication) to a first peripheral device 125 and a second peripheral device 150 over bus 175. The first peripheral device 125 and second peripheral device 150 may be configured to change configurations based on information provided by the host device 100, as described herein.

The devices may be any of various devices (e.g., PCIe devices), such as measurement devices (e.g., DAQ devices), processing devices, I/O devices, network devices, etc. Additionally, similar to above, the devices may include one or more programmable hardware elements or processors and memory to implement their respective functionality. In some embodiments, the devices 125 and 150 may be configured to acquire signals from the SUT 75 to perform testing. For example, the device 125 may be configured to measure and perform analog to digital conversion for voltage of the SUT 75. Similarly, the device 150 may be configured to measure and perform analog to digital conversion for current of the SUT 75. Further devices may be included in the chassis 50, such as devices for performing GPS measurements, e.g., acquiring time using GPS circuitry for synchronization purposes, among other possibilities.

In some embodiments, multiple SUTs 75 may be measured concurrently. For example, one or more devices in the test instrument 50 may be used for performing concurrent measurement, such as for RF testing, among other possibilities. Further, the test instrument 50 and/or devices included therein may be configured to perform measurements over a network, such as a wireless network (e.g., 802.11, WiMax, etc.).

Figure 2:
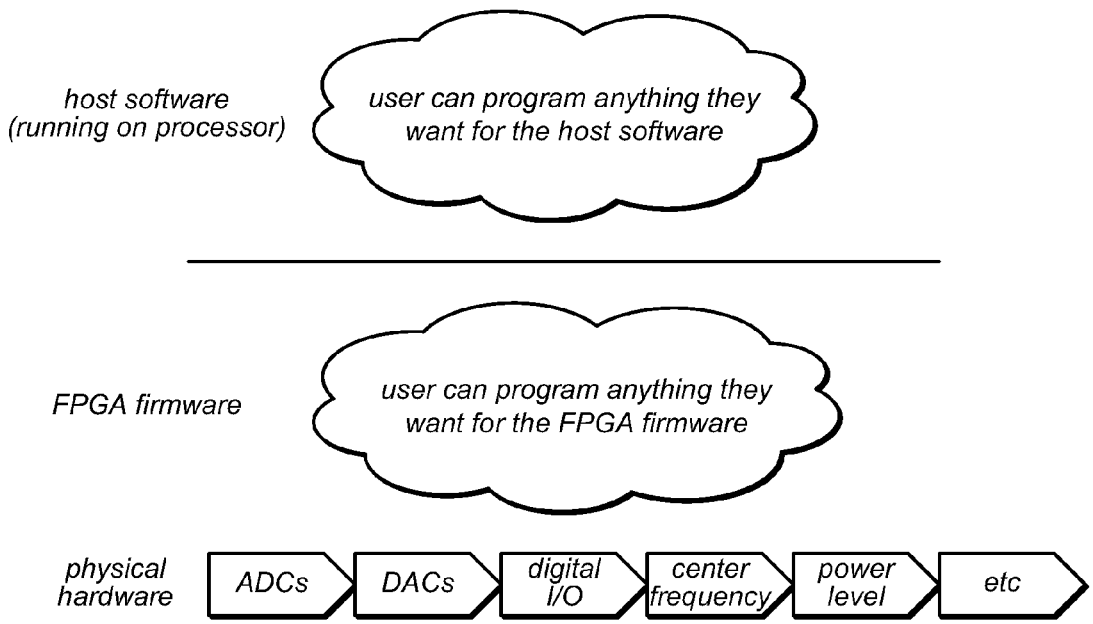

FIG. 3C illustrates host device 100 as a computer system. As shown in FIG. 2A, the host device 100 may be coupled to chassis 50 (e.g., including the first device 125 and the second device 150) and may include a display device and one or more input devices. Similar to descriptions of the host device 100 above, the host may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium. In alternate embodiments, the chassis 50 may include a host device and the computer system may be configured to communicate with the host device in the chassis 50. For example, the computer system may be used to configure the host device in the chassis 50 and/or the devices 125 and 150 also included in the chassis 50.

In various embodiments, the host device 100 may be coupled to a second computer system or device via a network (or a computer bus). The computer systems may each be any of various types, as desired. The network can also be any of various types, including a LAN (local area network), WAN (wide area network), the Internet, or an Intranet, among others. Similarly, the host device 100 may be coupled to the test instrument 50 via various mechanisms.

Figure 4:
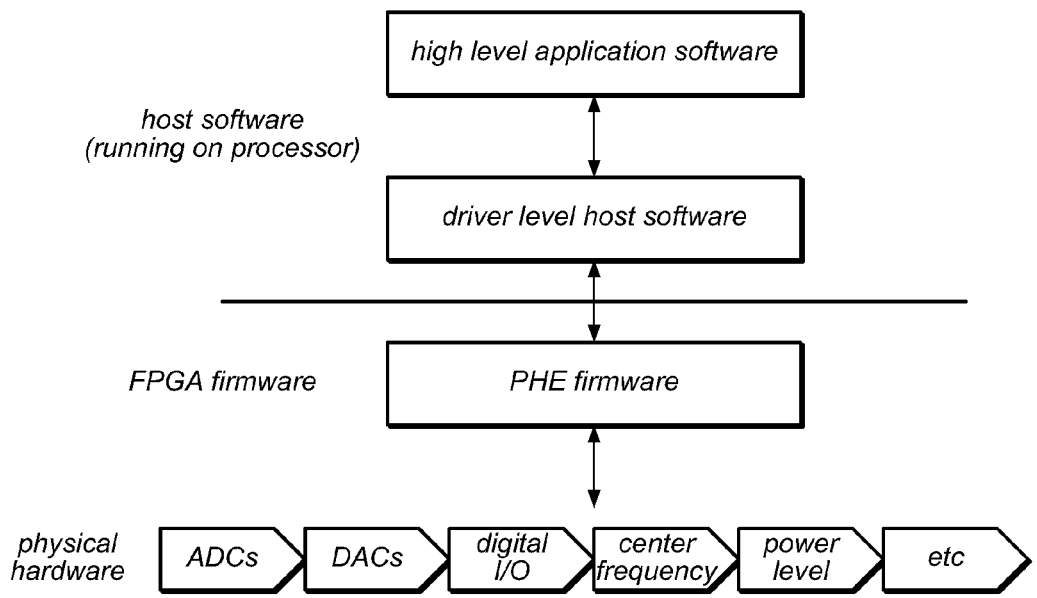
FIG. 4 illustrates a block diagram of an exemplary configuration model for a test instrument, according to one embodiment.

FIG. 4—Block Diagram of Exemplary Configuration Model for a Test Instrument

FIG. 4 is a block diagram illustrating an exemplary configuration model for a test instrument. As shown, the lowest level of the test instrument may be the physical hardware. In this embodiment, the hardware may include ADCs, DACs, digital I/O, center frequency (e.g., clocking hardware and/or local oscillators), power level (e.g., analog gain and/or attenuation hardware), etc. In one embodiment, this is the I/O that a user may have access to, e.g., during customization, and the hardware necessary to make that I/O function properly.

As also shown, above this level is the FPGA firmware, which may communicates with the physical hardware and the driver level host software and may implement the hardware features of the device. The driver level host software may execute on the computer (or controller) and may have an API that allows the user to access the features of the device. At the highest level is the application software, which may call into (or otherwise utilize) the driver level API.

The various embodiments provided herein may be particularly applicable to the configuration model shown in FIG. 4. More specifically, a user may be able to customize or configure both the configuration and code of the host software as well as the configuration and code of the firmware, implemented on a programmable hardware element. In one embodiment, the customizations described below may particularly apply to the customization of the driver level software and programmable hardware element firmware portion of the system.

Figure 5:
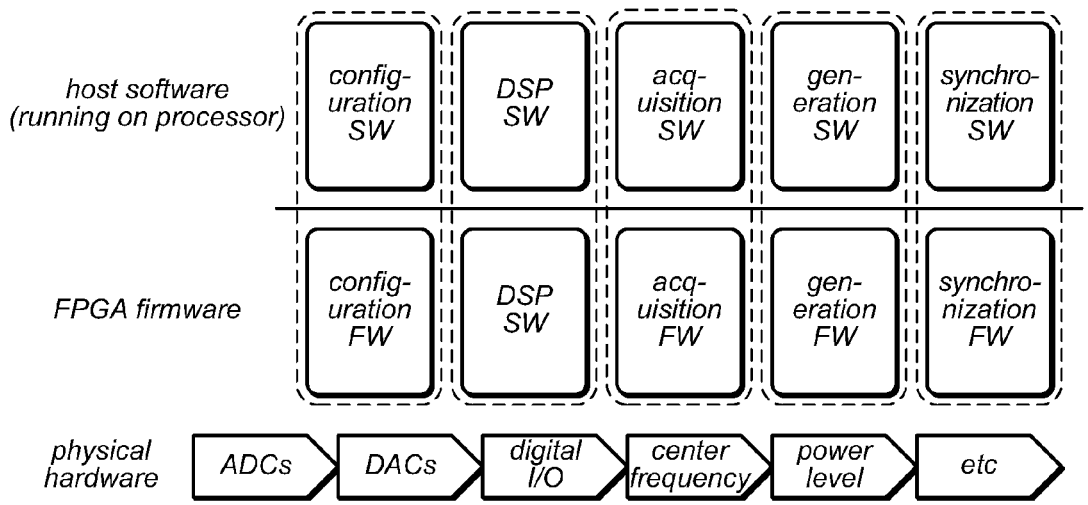
FIG. 5 is a block diagram of an exemplary configuration module including a plurality of code module pairs, according to one embodiment.

FIG. 5—Block Diagram of Configuration Model with Pairs of Code Modules

FIG. 5 illustrates a more specific configuration model of FIG. 4. In this embodiment, major components in the software and firmware of FIG. 4 have been broken into five code module pairs (processor-side and PHE-side code modules). These code pairs may implement at least the basic functionality typically found in a test instrument. The software code modules may correspond to driver level host software and/or high level application software, as desired. The processor-side code modules may be executed by one or more processors of the test instrument (e.g., located in the host 100, device 125, device 150, etc.) and the PHE-side code modules may be implemented by one or more PHEs of the test instrument (e.g., located in the devices 125, device 150, etc.).

As shown, the code module pairs include configuration, DSP, acquisition, generation, and synchronization, although more or less pairs are also envisioned. The configuration code module pair may be used for programming the physical hardware to a given state (e.g., power level, frequency, data rate, etc), and/or calibrating the test instrument. The DSP code module pair may be used for changing the sample rate of the data, filtering the data to improve the frequency response of the test instrument, digitally changing the gain of the data, or other processing. The acquisition code module pair may be used for acquiring data from the inputs and for provision to the host. The generation code module pair may be used for sending data from the host out the outputs. The synchronization code module pair may be used for aligning I/O between multiple modules or cards within the test instrument and/or between multiple test instruments, as desired.

These code modules may be provided to the user in a number of ways. For example, the code modules may be provided within a configuration tool or development environment, which may be used to configure the test instrument. For example, the user may install software on a computer system (e.g., the computer system 100 of FIG. 3C) and may use the software to configure the test instrument. In one specific embodiment, the code module pairs may be installed within or along with a development environment, e.g., a graphical programming development environment, such as LabVIEW® provided by National Instruments.

In one embodiment, the code modules may be included in one or more graphical programs having a plurality of nodes connected by wires. For example, there may be a first graphical program corresponding to software of the host of the test instrument and a second graphical program corresponding to the PHE of the test instrument. Alternatively, the functionality of the test instrument may be fully specified in a single graphical program. The interconnected nodes of the graphical program(s) may visually represent functionality of the one or more graphical programs. However, the code modules may be provided in a number of different development environments, and are not limited to graphical programming embodiments.

In one embodiment, the code modules may be provided in one or more templates within the development environment. For example, a user may be able to open a template project which includes the code modules and which may be ready for configuration to a test instrument (e.g., may be operable without modification). Accordingly, the user may be able to simply modify the already present code modules in order to configure to the test instrument to implement the desired behavior. The code modules may appear as individual modular blocks (e.g., which are interconnected) on the display of the computer system. In one embodiment, a user may be able to expand each block to modify its functionality (e.g., where it may be represented by a node, such as a sub-VI, which expands into a graphical program in graphical programming embodiments). Alternatively, or additionally, the code modules may simply be included in a program with sections corresponding to each of the modular blocks. For example, the template may include a first set of code for the host and a second set of code for the programmable hardware element. Each of these sets of codes may have sections corresponding to each of the modular blocks (e.g., where each section is labeled, such as by a color, which indicates which modular block the section or individual nodes correspond to).

In some embodiments, the code modules (and/or pairs of code modules) may be provided within a palette or library. For example, a user may select which code modules (or pairs of code modules) he would like included in the program. The user may include these modules by selecting the desired code modules and manually including them in the desired program (e.g., by dragging and dropping them into a graphical program, possibly from a palette, following graphical programming embodiments). Alternatively, or additionally, the user may simply select the desired code modules, and they may be automatically assembled or integrated into a new or existing program. For example, a test instrument wizard (e.g., a series of GUIs) may be displayed on the display where a user may select the desired functionality of the test instrument, e.g., by selecting the desired functionality. In response, a program or configuration may be automatically created or assembled which implements the desired functionality, e.g., by automatically including the appropriate code modules. Thus, the code modules may be specified or provided in a number of ways.

As discussed below, these code modules may be customized by the user. More specifically, the user may be able to choose which of the code modules to keep, which to change, and which to eliminate, without affecting the functionality or behavior of the other code modules. Because the code modules may be provided, e.g., within a development environment or configuration tool of the test instrument, a user may be able to fully customize the functionality of the test instrument, e.g., without having to write much code.

Additionally, an application programming interface (API) may be provided for interacting with the plurality of pairs of code modules. For example, this API may be used by the "high level application software" of FIG. 4 to interact with the driver level host software and PHE firmware (e.g., corresponding to the pairs of code modules of FIG. 5). In some embodiments, this API may remain unchanged and usable even after modification or customization.

Figure 6:
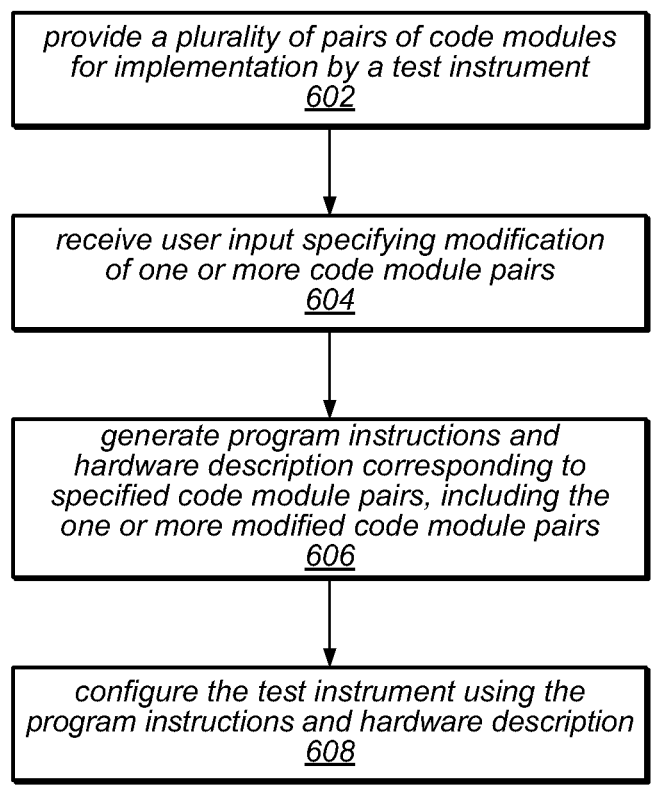
FIG. 6 is a flowchart diagram illustrating one embodiment of a method for customizing a test instrument.

FIG. 6—Customizing a Test Instrument

FIG. 6 illustrates a method for customizing a test instrument. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, a plurality of pairs of code modules may be provided, e.g., within a development environment for configuring or programming the test instrument. As discussed above, regarding FIG. 5, these code modules may be provided in a number of different manners. As also discussed, each pair of code modules may include a processor-side code module having program instructions for execution by a processor of the test instrument and a PHE-side code module for implementation on a programmable hardware element of the test instrument. Thus, in each pair, the processor-side code module and the PHE-side code module may collectively implement a function in the test instrument. For example, the processor-side code module may be executable by the processor to perform a first portion of a function, and the PHE-side code module may be configured to be implemented on the programmable hardware element to perform a corresponding second portion of the function.

As discussed above, the pairs of code may provide functionality associated with hardware configuration, digital signal processing, acquisition, generation, or synchronization, among other possibilities. Additionally, the programmable hardware element may interact with underlying hardware of the test instrument, such as ADCs, DACs, digital I/O, center frequency (e.g., clocking hardware and/or local oscillators), power level (e.g., analog gain and/or attenuation hardware), etc.

The plurality of pairs of code modules in 602 may refer to those included for specifying functionality of a test instrument. Thus, there may be more pairs of code modules than the plurality of 602 that are not included for configuring the test instrument. In one embodiment, the user may have selected the plurality of code module pairs from a larger set of code module pairs. Thus, the pairs of code modules in 602 may be a subset of a total number of available code modules, e.g., and may be used for configuring a particular test instrument.

In 604, user input may be received which specifies modification of code of one or more code module pairs. For example, the user input may modify the processor-side code module and/or the PHE-side code module of one or a plurality of the code module pairs provided in 602 and/or included in the current configuration of the test instrument.

The customization or modification of the code modules may include a variety of actions. For example, the user may remove portions or all of one or more of the code modules. Additionally, or alternatively, the user may add additional functionality to one or more code modules, as desired. Even further, the user may add functionality outside of any of the code modules, e.g., to provide functionality that is different from that provided by the currently selected code modules. Thus, a user may modify the PHE and/or software portions of one or more of the code module pairs, remove some or all of the PHE and/or software portions of one or more of the code module pairs, and/or add new PHE and/or software code in addition to the existing code provided by the plurality of code module pairs, as desired. However, in some embodiments, a portion of the code modules (e.g., the PHE-side code modules) may be fixed, i.e., they may not be changed by the user, e.g., during customization.

The user may specify the modification in a variety of manners. For example, where the code modules are specified via graphical program code, the user input may specify customization of the graphical program code, e.g., the user may modify the nodes and/or connections between the nodes to customize the behavior of the test instrument. Alternatively, the user input may be specified in a different development environment (e.g., modifying textual code of the code modules), via a test instrument configuration tool (e.g., using a configuration wizard or other GUI), etc.

In one particular embodiment, the customization may specify adaptive behavior for the test instrument, e.g., such that it may dynamically adjust operation of the test instrument in response to signals from the test system (e.g., based on a characteristic of received signals, content of received signals, etc.). Further details regarding this adaptive behavior are provided below with respect to FIG. 7.

In 606, program instructions and hardware description(s) corresponding to specified code module pairs, including the one or more modified code module pairs may be generated. For example, the software of the processor-side code modules may be compiled for execution by processor(s) of the test instrument. For example, the type of processor(s) of the test instrument may be detected and the program instructions may be generated to correspond to the instruction set of the detected type of processor(s). There may be processors in various different locations within the test instrument, e.g., within a host, which may be collocated with the PHE(s) and underlying hardware or not (e.g., within the chassis or coupled to the chassis, as shown in the embodiments of FIGS. 3B and 3C). Additionally, there may be processors within individual cards or devices of the test device (e.g., devices 125 and/or 150 of FIG. 3B). Thus, the software may be executed by one or a plurality of processors located in various different areas of the test device.

Additionally, the PHE-side code modules may be converted to hardware description level (HDL) code, such as Verilog, for implementation on the PHE(s) of the test instrument. Similar to above, the PHE code may be in various locations, e.g., within individual devices of the test device (e.g., devices 125 and/or 150 of FIG. 3B), or in other locations, e.g., the backplane of the chassis 50. In one embodiment, a netlist may be generated (e.g., from the HDL code) for programming gates of the PHE(s). In graphical programming embodiments, the generation of HDL code or netlists may be performed in the manner described in U.S. Pat. No. 6,219,628, which was incorporated by reference in its entirety above.

Finally, in 608, the test instrument may be configured with the program instructions and according to the hardware description(s). More specifically, the PHE(s) of the test instrument may be programmed according to the generated HDL code or netlist(s) and the program instructions may be stored on one or more memory mediums of the test instrument, e.g., for execution by processor(s) of the test instrument. Note that the program instructions may be stored in a host portion of the test instrument, which may be included within the same enclosure as the PHE of the test instrument (e.g., and underlying hardware) or may be separate from the enclosure of the PHE of the test instrument (e.g., of an external computer system coupled to a chassis containing the PHE and underlying hardware). In either case, the test instrument may include both the host and PHE portions, even if the host portion is implemented via a separate computer system.

The test instrument may then be configured and may be ready to operate as configured, e.g., to test an SUT.

Figure 7:
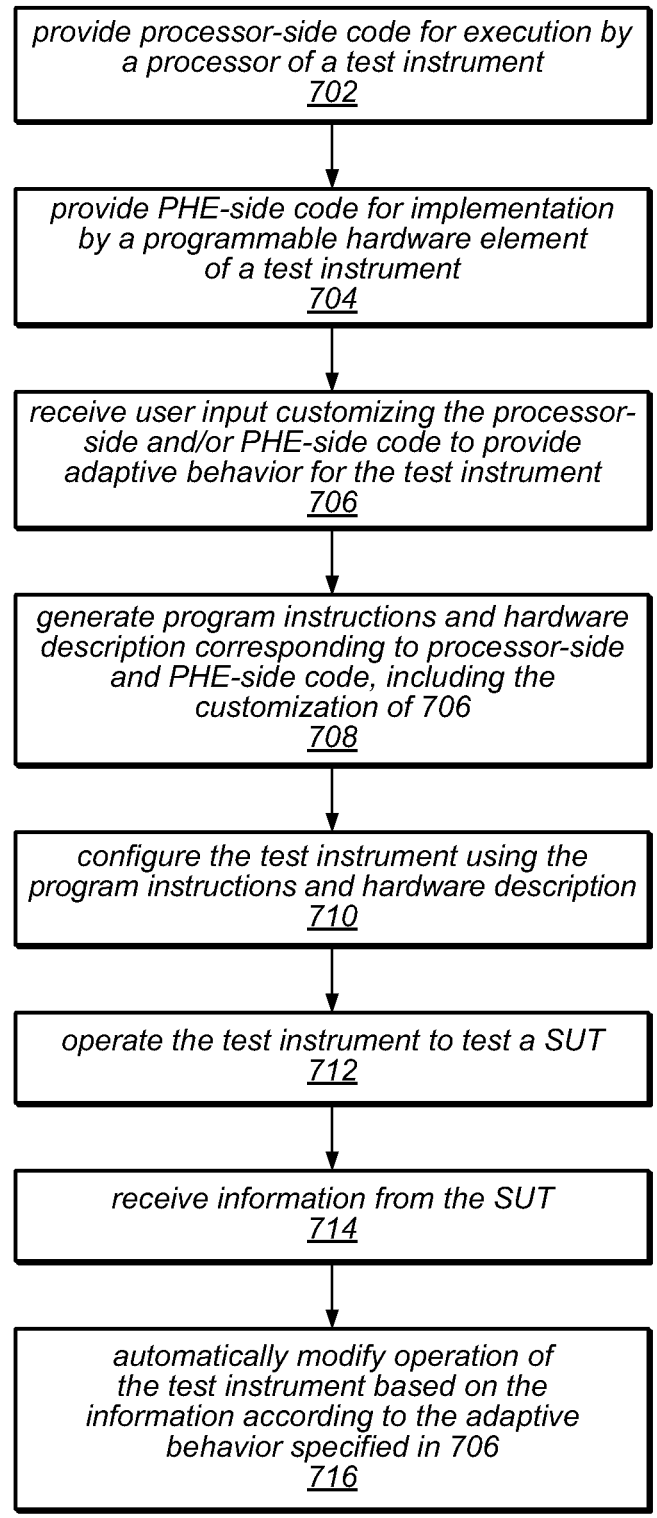
FIG. 7 is a flowchart diagram illustrating one embodiment of a method for modifying test instrument operation based on information from a SUT.

FIG. 7—Modifying Test Instrument Operation Based on Information from a SUT

FIG. 7 illustrates a method for modifying test instrument operation based on information received from a SUT. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 702, processor-side code may be provided. The processor-side code may be intended for execution by a processor of a test instrument. Additionally, in 704, PHE-side code may be provided. The PHE-side code may be intended for implementation by a programmable hardware element of a test instrument. For example, the processor-side code and PHE-side code may be provided as pairs of code modules as discussed above regarding FIGS. 6 and 7. However, the code may be provided in any form, as desired. For example, the code may be provided as uniform code without indications of modules or sections in the code. For example, the processor-side code may be monolithic and the PHE-side code may also be monolithic. Regardless, the provided code may specify functionality of a test instrument.

In 706, user input may be received customizing (or otherwise modifying) the processor-side and/or PHE-side code to provide adaptive behavior for the test instrument. More specifically, the user input may specify functionality or behavior which may allow the test instrument to dynamically or automatically adjust its operation based on information received from a SUT, e.g., during testing of the SUT. The modification to operation of the test instrument may include modification of processing of signals received from the SUT, modification of signals sent to the SUT, configuration of the test instrument, configuration of the SUT, and/or any desired modification.

For example, the customization may specify that the test instrument automatically adjust methods of receiving or modifying signals received by the SUT based on characteristics of the signals. As a specific example, the test instrument may automatically adjust the gain of signals received by the SUT to an appropriate level (e.g., increasing gain when the level is too low or decreasing gain when the level is too high).

As another example, the customization may specify that the test instrument should modify its behavior based on information provided by the SUT (e.g., based on content encoded within the signals sent by the SUT). For example, a user may desire to let the SUT control changeover of tests, e.g., where the SUT may trigger changeover from a first test mode to a second test mode by providing a particular stimulus signal. Additionally, the SUT may be able to respond to or initiate frequency hopping, e.g., during RF testing. Other types of adaptive behavior are also envisioned.

Another example may include when the SUT and test instrument are communicating to each other using a defined protocol. In that case, there may be Request and Acknowledge signals passing back and forth between the two systems, along with data. This may allow the SUT to request responses or operation changes and implement intelligent tests. For example, an SUT that is a semiconductor IC for wireless communication may be able to test perform internally (e.g., internal hardware or software), if it receives the correct stimulus from the test instrument. For example, the SUT may request a signal at X frequency and Z power, which it may utilize to perform self checks. Then, the SUT may continue by requesting a signal at Y frequency and W power, and so on.

Another example may include when testing an SUT, and the SUT is checking its bit-error rate (BER). The test may start at a low data rate, and if the SUT detects that its BER is very good, it may request a higher data rate from the test instrument. This sequence may continue until the SUT detects a bad BER, at which point it may request the test instrument to lower the data rate. This process may be used as part of the process of "binning" an SUT, to determine it's maximum operating speed.

This customization may be performed in the manner described above in 604; however, other customizations are also envisioned. For example, as discussed above, the code may not be provided in code modules or pairs of code modules, but may be instead be provided in other manners, such as monolithic code. Accordingly, the user may simply customize the code by modifying the monolithic code. Similar to embodiments above, a user may also perform customizations using a series of GUIs (e.g., a wizard) which may then automatically modify the code according to the user's input. Other customizations are envisioned.

In 708, program instructions and hardware description(s) corresponding to processor-side code and the PHE-side code may be generated, including the customization of 706. This step may be performed in a similar manner to 606.

710, the test instrument may be configured using the program instructions and hardware description. This step may be performed in a similar manner to 608.

712, the test instrument may be operated to test a SUT. More specifically, the processor(s) of the test instrument may execute the program instructions and the PHEs of the test instrument may operate according to the hardware description(s) to test the SUT. During testing, various stimulus signals may be provided from the test instrument to the SUT and various responses or signals may be provided from the SUT to the test instrument.

In 714, during testing, information may be received from the SUT. The information may correspond to the customization specified in 706 above. For example, the information may correspond to characteristics of signal(s) provided by the SUT, information encoded in the signals provided by the SUT (such as data), or any other information specified by the customization.

In 716, in response to the information, operation of the test instrument may be automatically modified based on the information, according to the adaptive behavior specified in 706.

Note that while FIG. 7 includes the step of customizing the processor-side code and/or the PHE-side code to implement the adaptive behavior, it is possible that the adaptive behavior may have been previously specified in the code. Accordingly, customization may not be required for the test instrument to behave in the adaptive manner described herein. Further, while two sets of code are described, a single set (e.g., the processor and/or the PHE) may be used instead.

FIGS. 8-14—Exemplary Configurations and Modifications of a Test Instrument

FIGS. 8-14 illustrate exemplary configurations and modifications of a test instrument. While these figures are described with the use of an upper level API, some embodiments may not implement an API. Thus, the exemplary configurations and modifications may still be implemented without the use of the described API.

Figure 8:
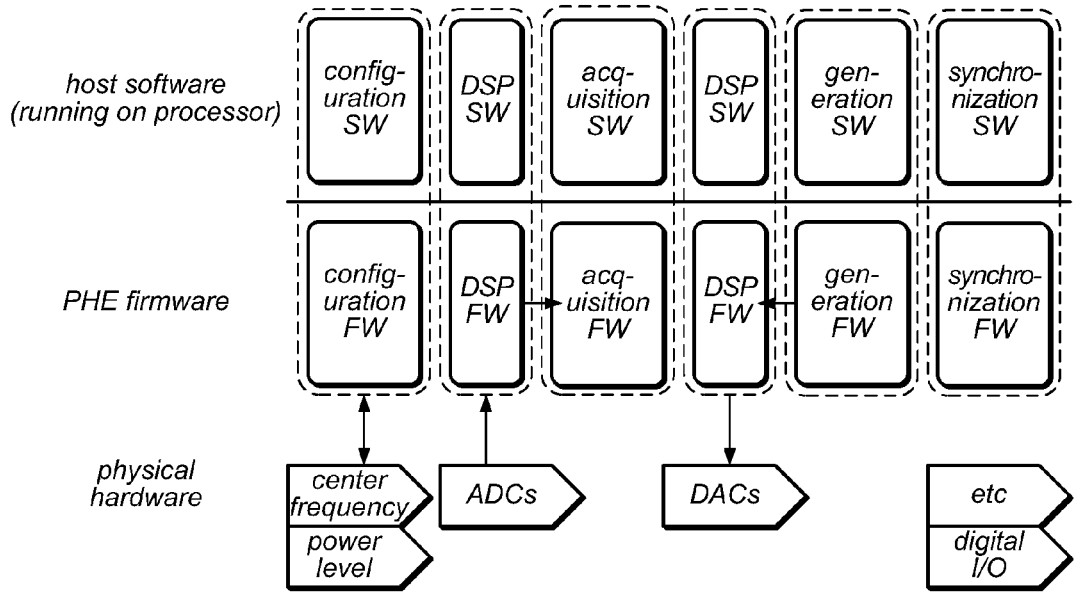
FIGS. 8-14 are exemplary configurations an modifications of a test instrument, according to various embodiments.

FIG. 8 illustrates an exemplary initial configuration of a test instrument, e.g., one which may be provided to a user within a template or default configuration for the test instrument. FIG. 8 illustrates the typical connections between the PHE firmware, and the physical hardware.

For example, the user may use the configuration host software API to specify a particular power level and center frequency at the host software level. This value may then be sent to the firmware and lastly down to the physical hardware. For acquisition, the data comes into the ADCs, and then gets captured by the Acquisition Engine in the PHE via the DSP firmware (FW), and then can be read out through the acquisition host software API. On the generation side, the API may be used to generate data at the software level, which may be passed to the generation FW in the PHE, then to the DSP FW, and finally to the SUT via the DACs.

Figure 9:
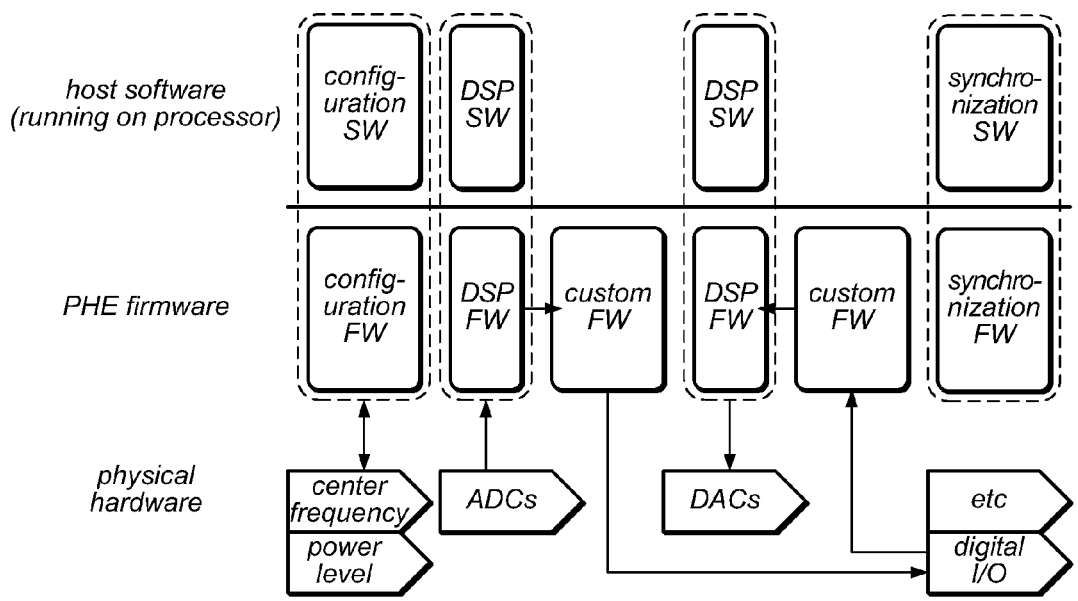

FIG. 9 illustrates an exemplary modification to the initial configuration of FIG. 8. In this example, the Acquisition Engine and Generation Engine have been removed. All of the other software/firmware remains unchanged. In the modified version, the digital I/O connector is used for streaming the ADC and DAC data, instead of the host. This allows the user to use a different device for data acquisition and generation, which can be connected to the digital I/O port.

Figure 10:
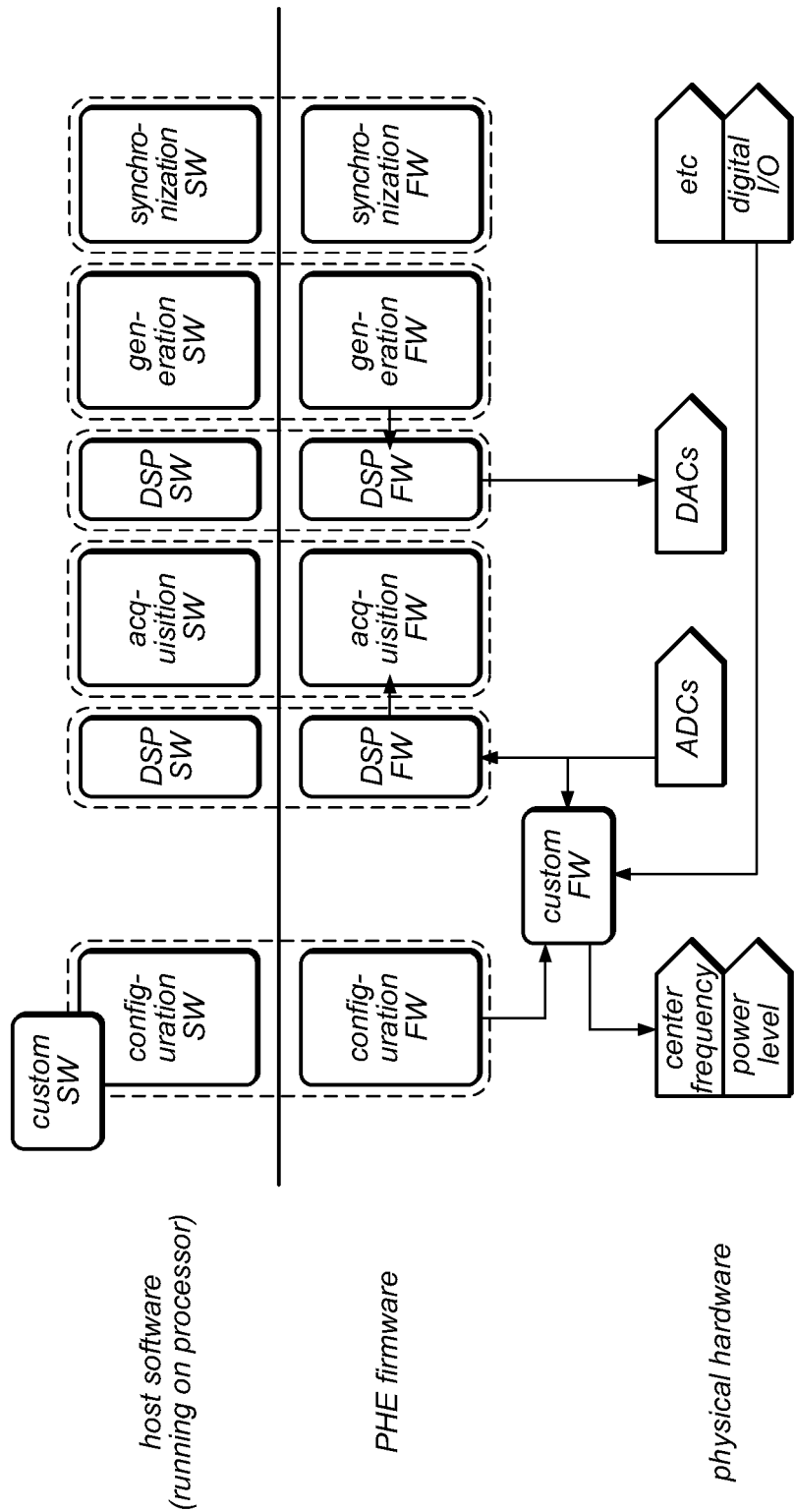

FIG. 10 illustrates a different modification to the initial configuration of FIG. 8. In this example, the configuration of the hardware can be controlled by the SUT (e.g., following the method of FIG. 7). When a configuration is called from the host API, instead of writing it directly to the physical hardware, it may be stored in some custom FW (for example, in a memory medium). In one embodiment, the user could store multiple configurations or operating modes in the memory. This approach allows for calibration to be taken into account. Then, the configuration being used may be selected by SUT control, e.g., during testing, either by data received by the ADC, or through the Digital I/O port, as desired.

One example is an automatic gain control circuit (AGC). The user could store a plurality of different configurations, e.g., for 100 different power levels. Then, the custom FW could look at the power of the signal received by the ADC, and pick a different configuration at run-time to maximize the dynamic range of the ADC.

Another example would be frequency hopping. The user could store 16 different configurations, e.g., for 16 different center frequencies. Then, the SUT could request a new center frequency, either through the data path (by decoding the ADC data) or through the digital I/O port. Accordingly, the operation of the test instrument may be automatically changed, e.g., during testing.

Figure 11:
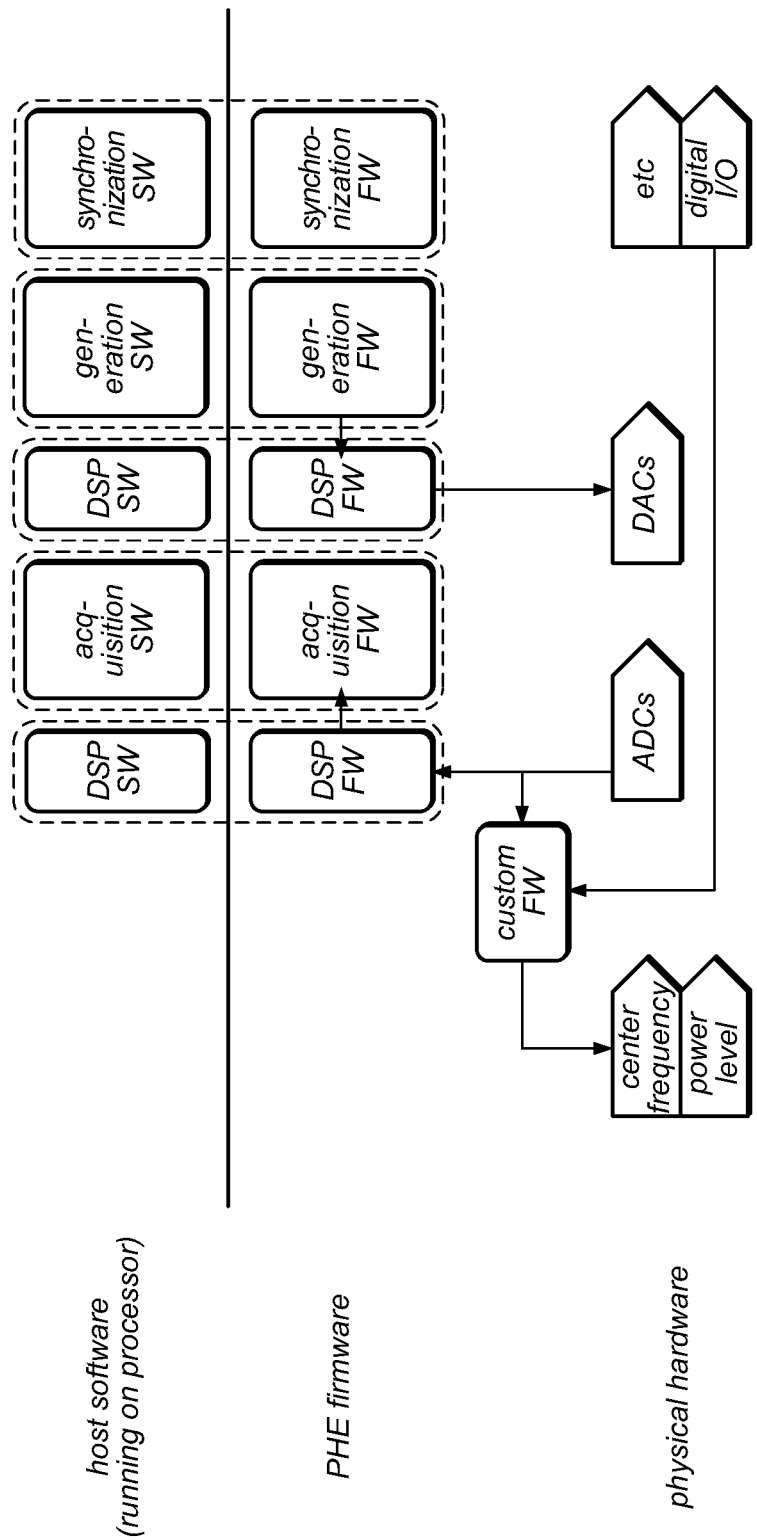

FIG. 11 illustrates a different modification to the initial configuration of FIG. 8. This example is similar to the previous example, except that the configuration software/firmware has been removed. Thus, in this example, the user can directly control the physical hardware from the PHE (e.g. by SUT control), but now calibration isn't necessarily taken into account.

Figure 12:
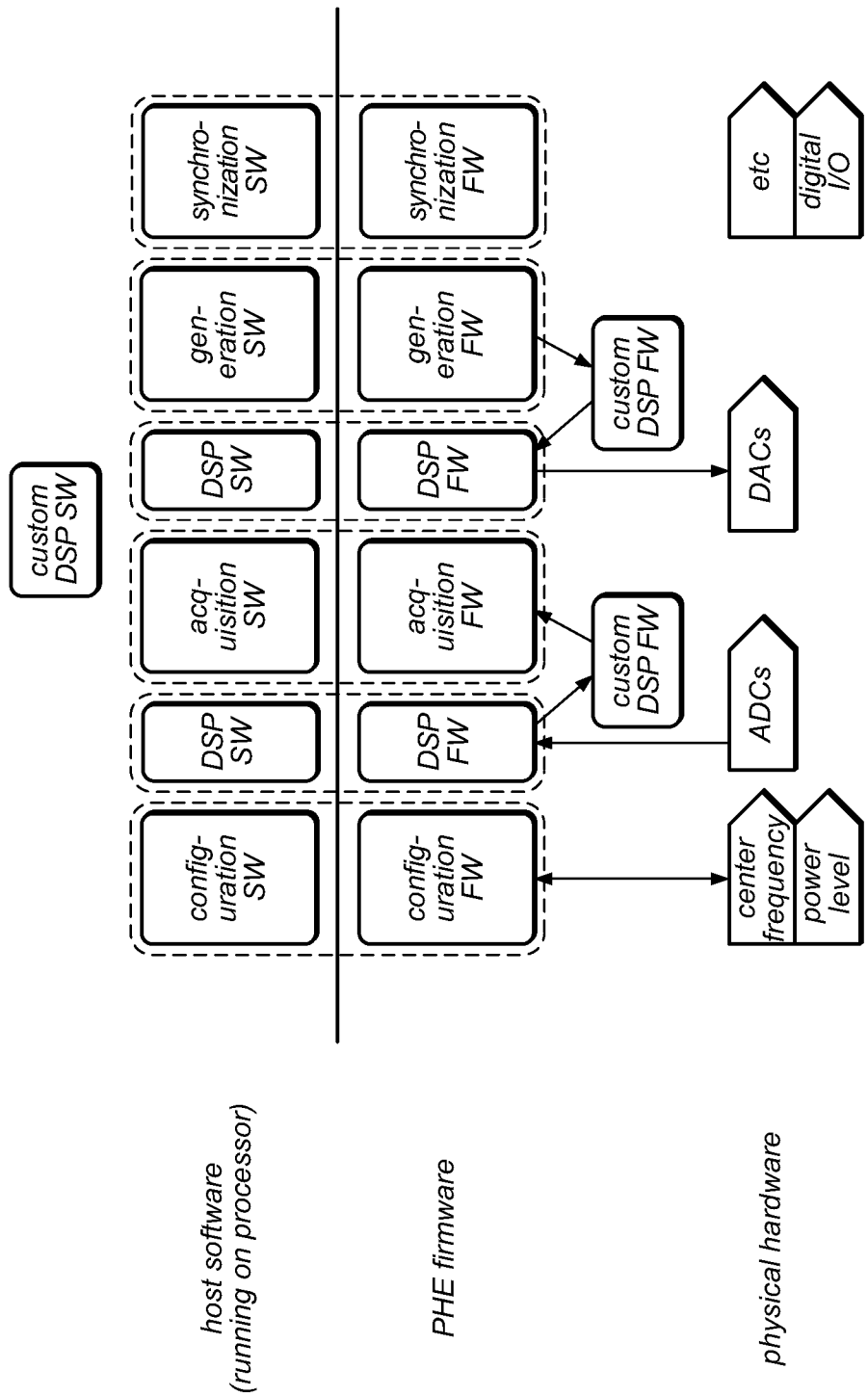

FIG. 12 illustrates a different modification to the initial configuration of FIG. 8. In this case, the user has inserted custom Digital Signal Processing logic into the data path of the ADC and/or DAC. They may also have custom host software for configuring the custom DSP firmware.

Figure 13:
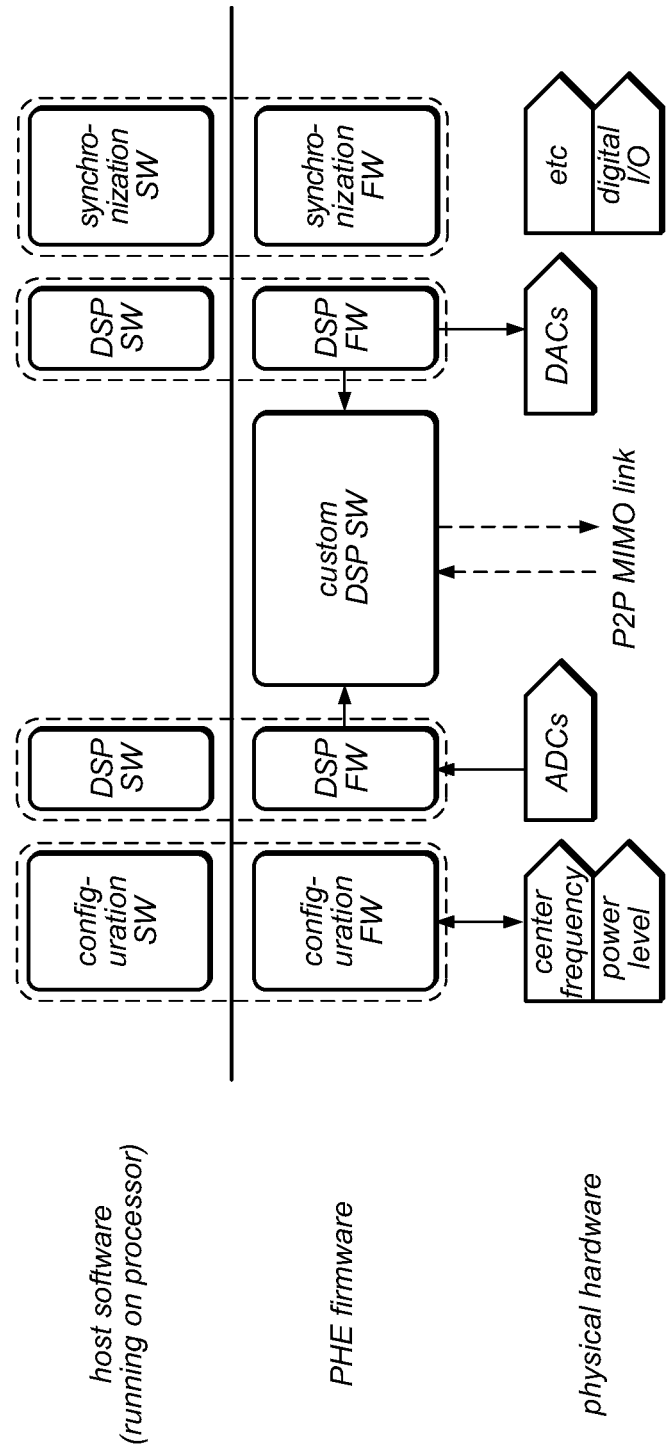

FIG. 13 illustrates a different modification to the initial configuration of FIG. 8. In this example, the data is received via the ADC, processed through custom DSP processing, and sent out the DAC. This could be used for a number of applications, one of which is a channel emulator. The custom DSP could modify the signal to have the affect of broadcasting the signal through some channel. In this example, the system may allow for data combination through the digital I/O port, or through peer-to-peer DMA links, e.g., for aggregating data from multiple devices to do MIMO processing.

Figure 14:
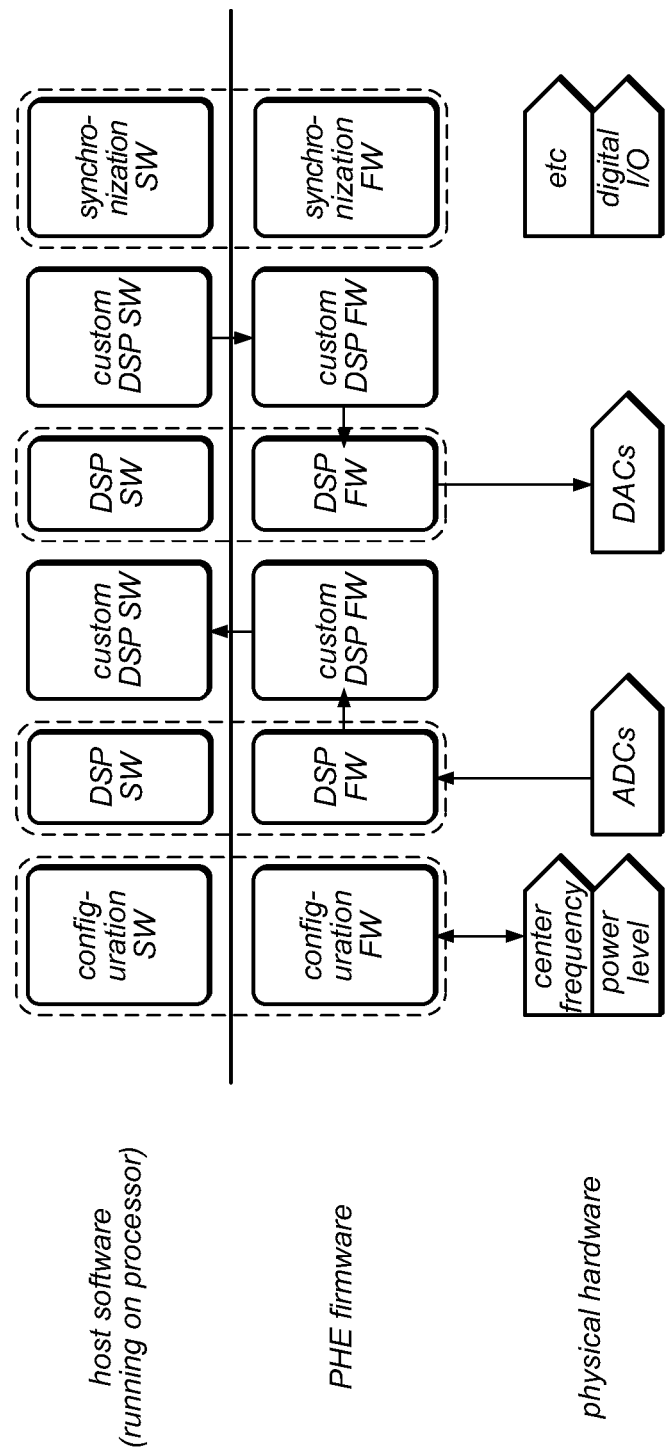

FIG. 14 illustrates a different modification to the initial configuration of FIG. 8. This example could be used for interfacing with a radio, or testing a radio. The ADC data may be decoded, depacketized, demodulated, etc, and sent to the host for final processing. Likewise for the DACs, the message data from the host may be encoded, modulated, packetized, etc, and finally sent to the DAC.

FIGS. 15A-18H—Exemplary Modifications Using Graphical Programming

FIGS. 15A-18H illustrate host and PHE side graphical programs that may be used during customization and operation of a test instrument. More specifically, these Figures show both the host code and PHE code for an RF OUT generation and RF IN acquisition example. Shown first is the unmodified building block approach. Shown second is a modified version where the data no longer comes from the host for generation, but comes in and out of the DIO port (e.g., corresponding to FIG. 9).

FIGS. 15A-15G illustrates a graphical program corresponding to software at the driver level (e.g., below the API discussed above). The graphical program is split into 7 sections, corresponding to the blocks of FIG. 8. In this particular example, all of the modular blocks are expanded and shown connected together. Visually, each section may be represented by differently colored labels. In alternate embodiments, the modular blocks may be shown connected together (e.g., similar to FIG. 8) and may be expanded into the underlying graphical code in response to user input (e.g., on a per block or global basis, as desired).

Figures 15A, 15B, 15C:
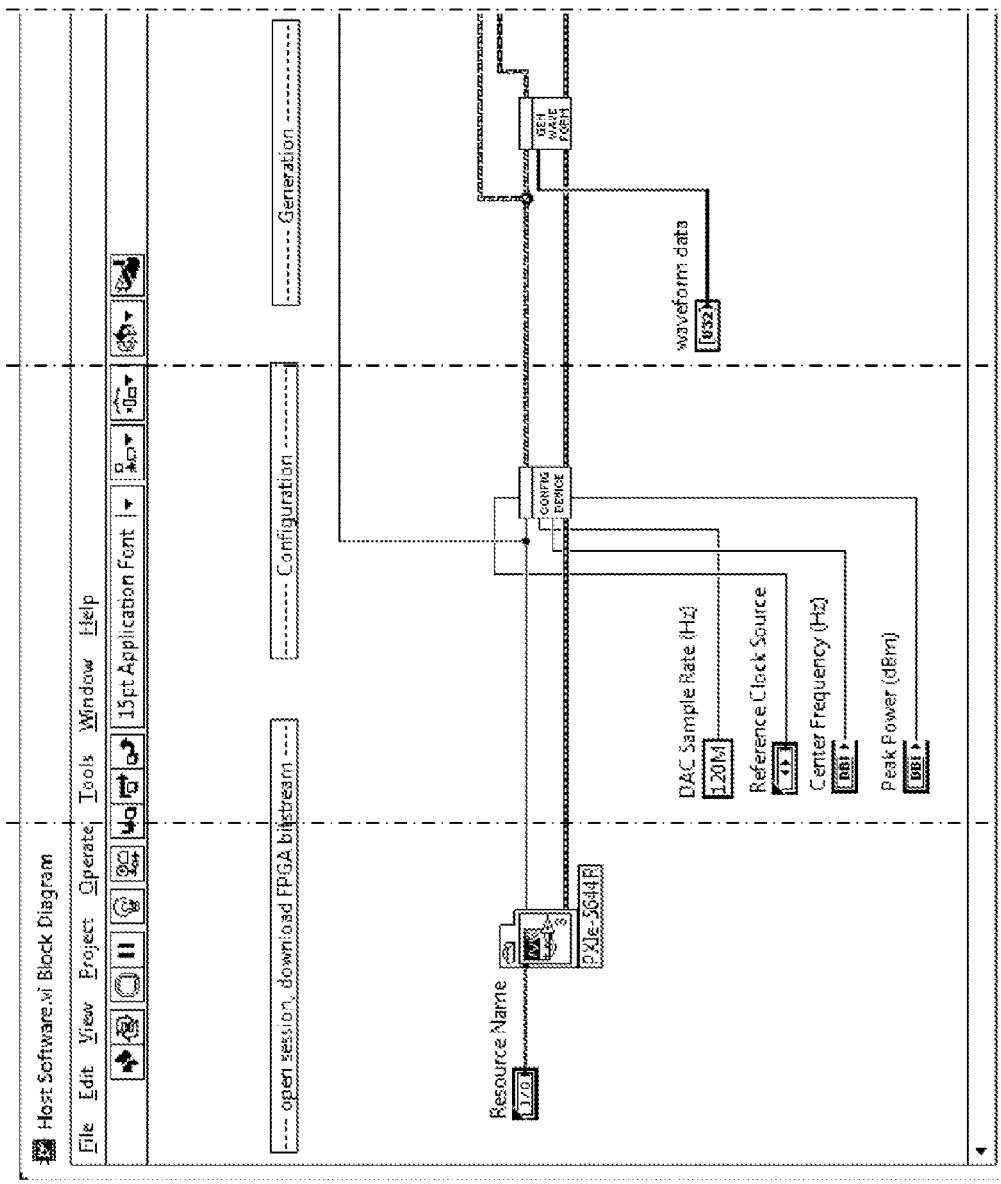
FIGS. 15A-18H illustrating the use of graphical programs for performing modifications to a test instrument, according to various embodiments.
Figures 15D, 15E:
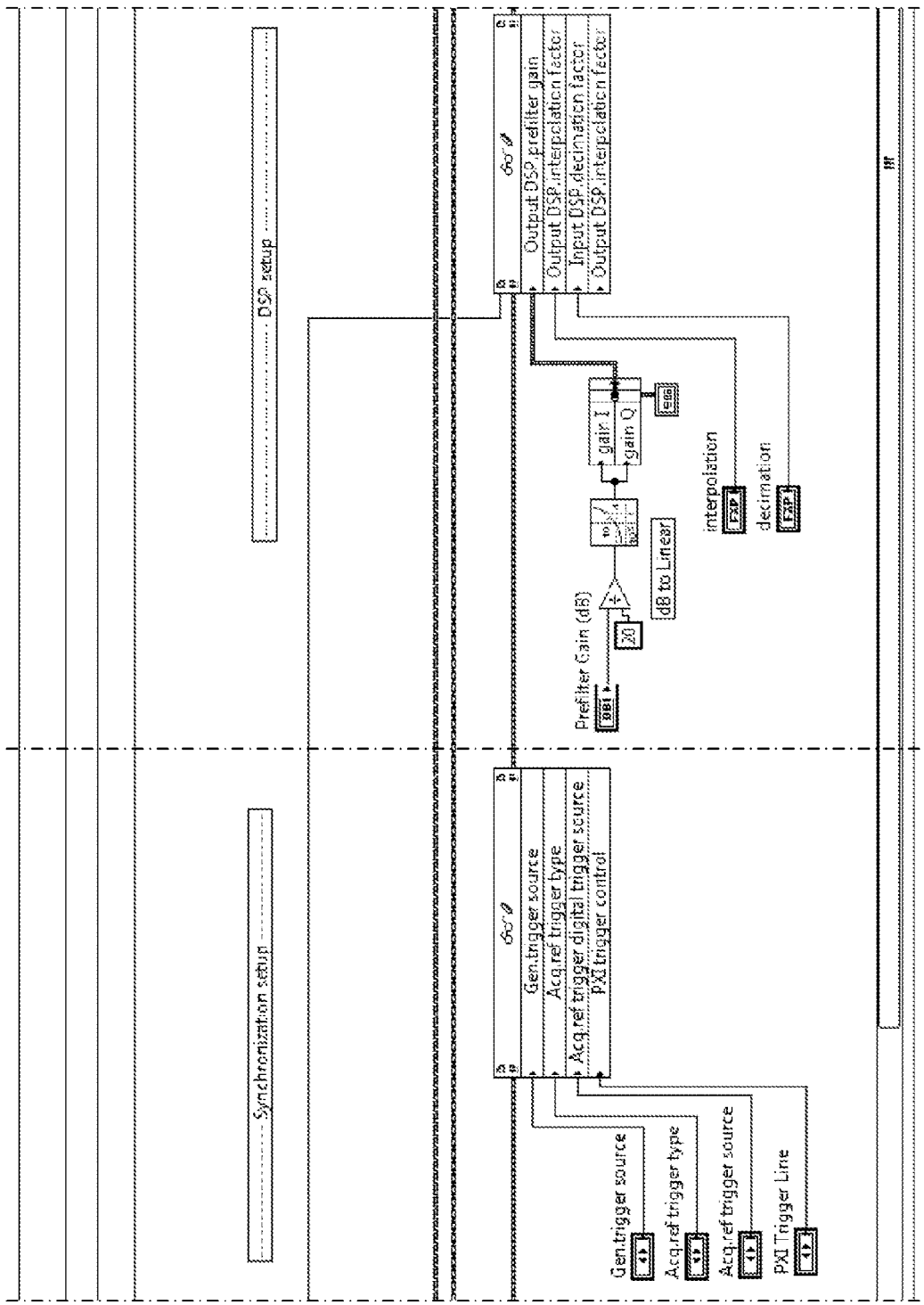
Figures 15F, 15G:
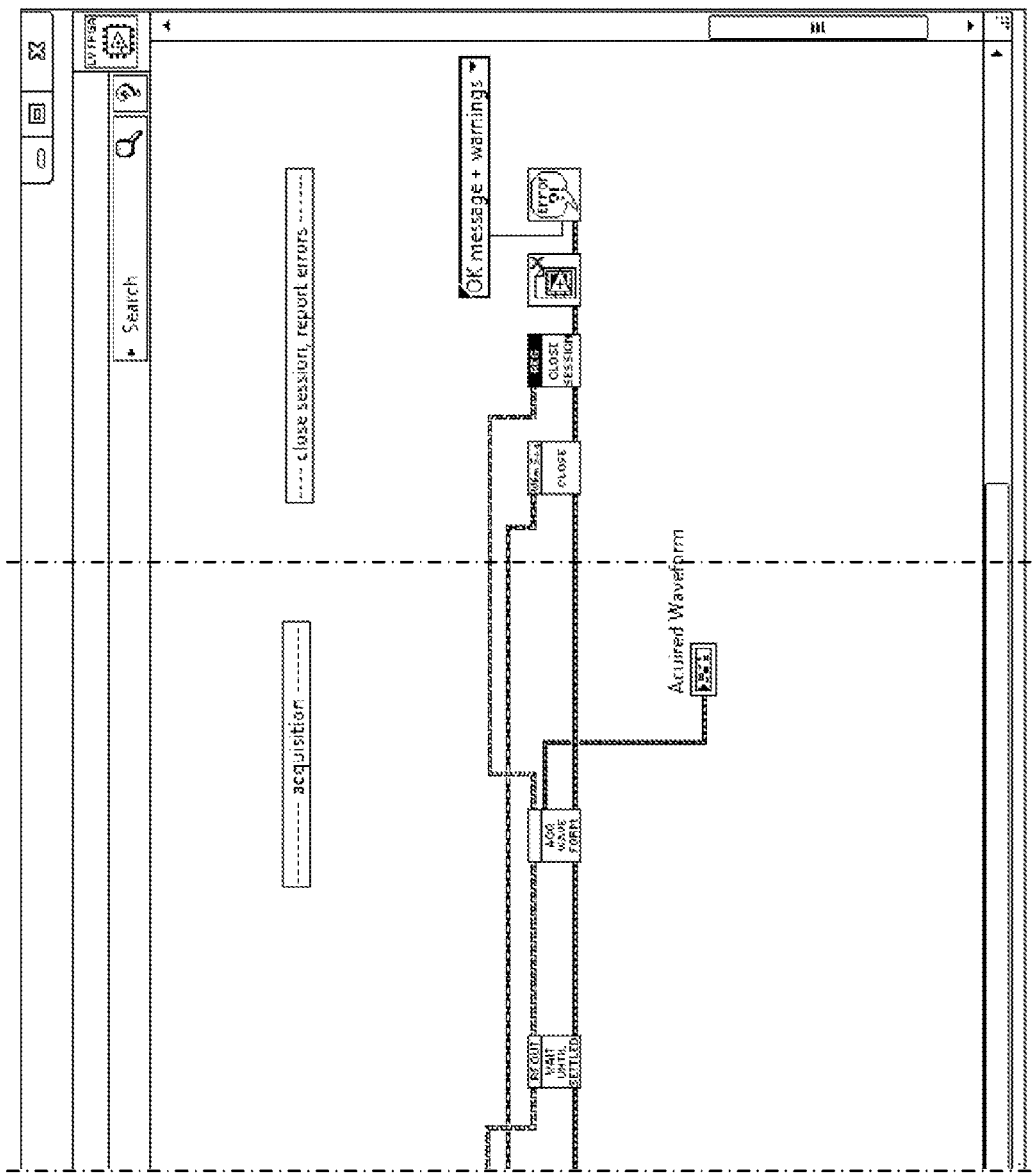
Figures 16A, 16B:
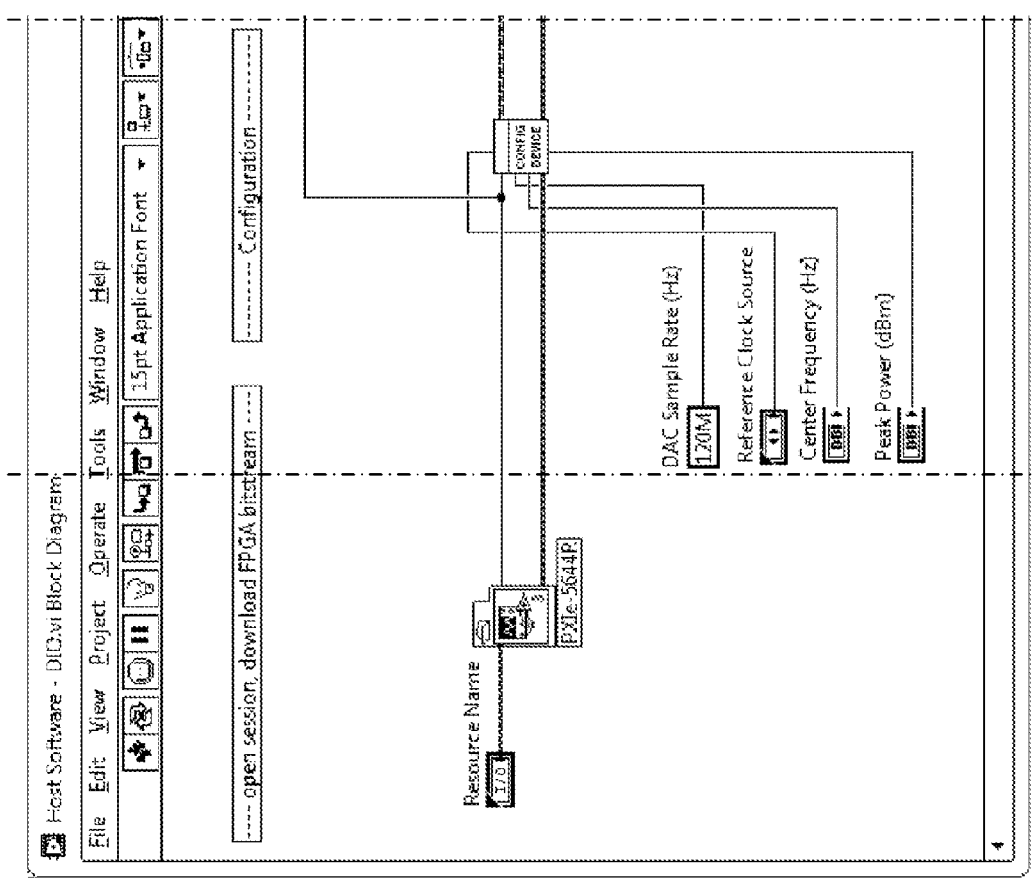
Figures 16C, 16D:
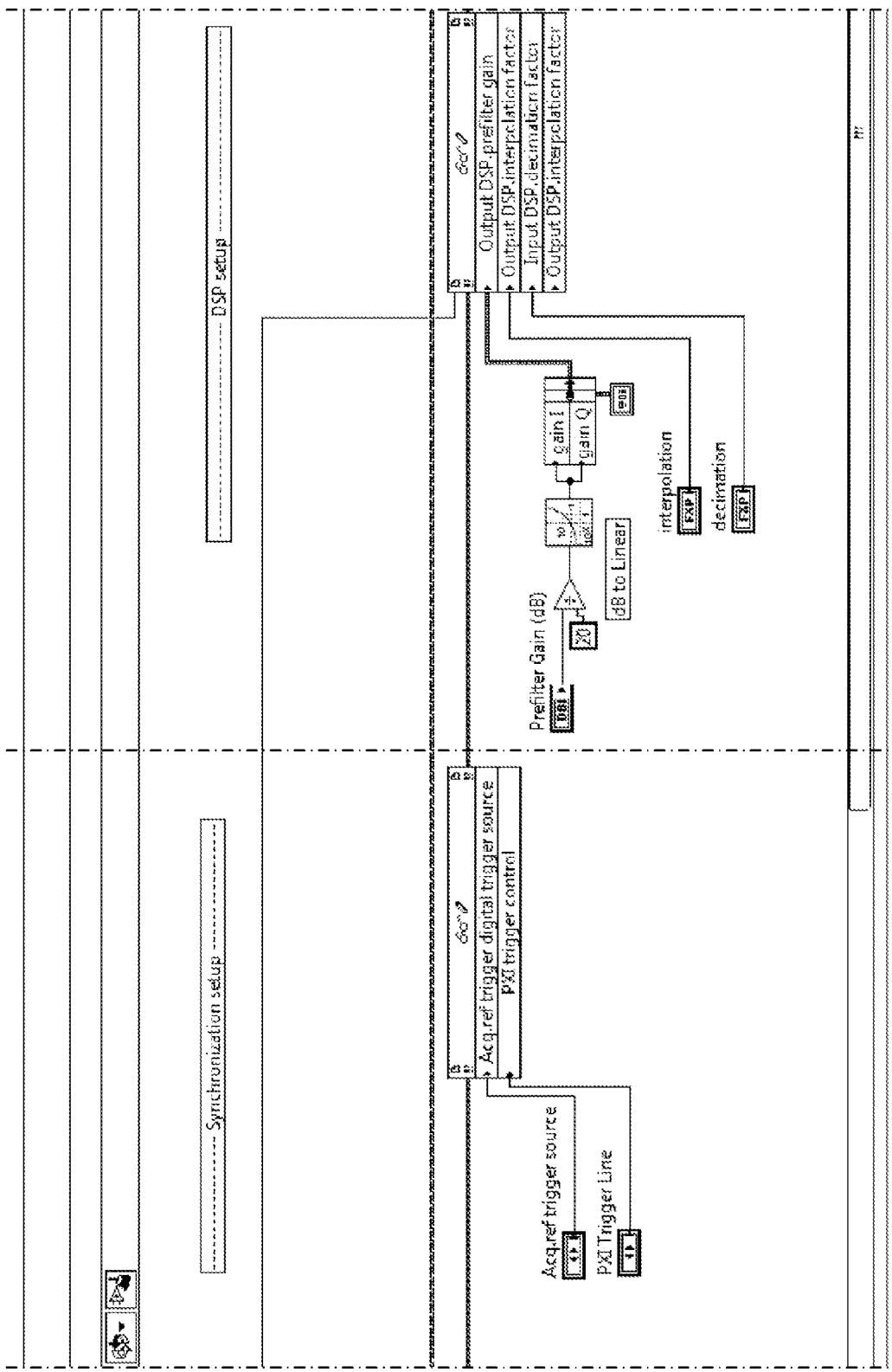

More specifically, FIG. 15A corresponds to session initialization and the opening of the communication port to hardware. FIG. 15B corresponds to configuration, e.g., for setting up the power level and center frequency. FIG. 15C corresponds to generation, e.g., for downloading the desired waveforms to the hardware, setting up how the hardware should generate in response to a trigger, etc. FIG. 15D corresponds to synchronization, e.g., for setting up the synchronization circuitry, routing the synchronization trigger, etc. FIG. 15E corresponds to DSP, e.g., for setting up the DSP (frequency shift, digital gain, rate change, etc.). FIG. 15F corresponds to acquisition, e.g., for acquiring a waveform and returning it back to the user. Finally, FIG. 15G corresponds to closing the session and resetting the instrument.

FIGS. 16A-16F illustrates the graphical program of FIGS. 15A-15G except that the generation and acquisition code has been removed and replaced with some custom code for setting up the custom PHE firmware, much like the example shown in FIG. 9. In this example, 16A corresponds to session initialization and the opening of the communication port to hardware, FIG. 16B corresponds to configuration, FIG. 16C corresponds to synchronization, FIG. 16D corresponds to DSP, and FIG. 16F corresponds to closing the communication port to hardware and closing the session.

In this example, FIG. 15C (corresponding to generation) and 15F (corresponding to acquisition) have been replaced with custom code for setting up the custom PHE firmware, shown in FIG. 16E. More specifically, this code may be used for setting up the direction of the DIO signals, clearing the FIFO's for the DIO port, and starting the transfer of data in/out the DIO port.

FIGS. 17A-17I illustrates a graphical program corresponding to code at the firmware level (e.g., for implementation on a PHE). The graphical program is split into several sections, similar to the blocks of FIG. 8. Similar to above, the code modules may be visually indicated and/or displayed in various manners.

Figures 17A, 17B:
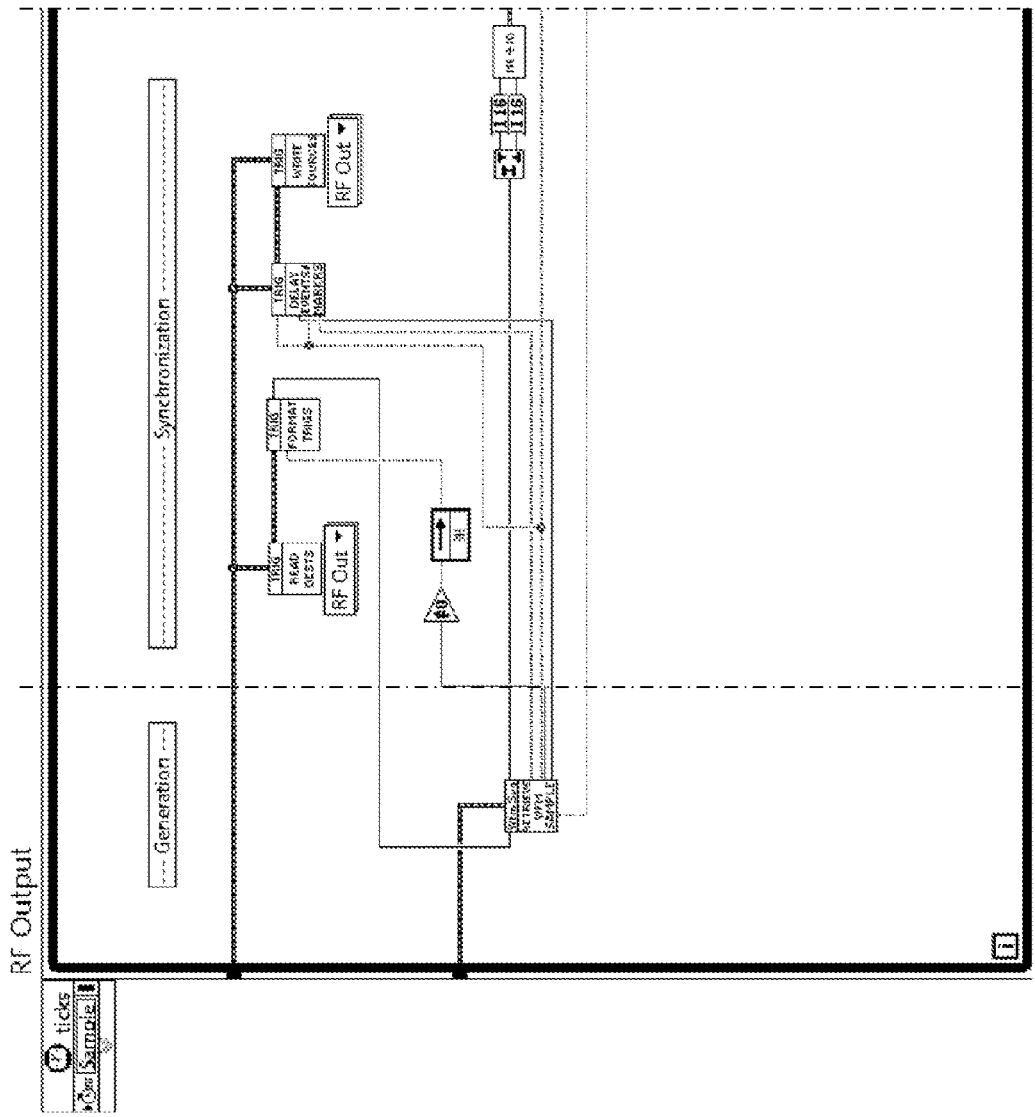
Figures 17C, 17D:
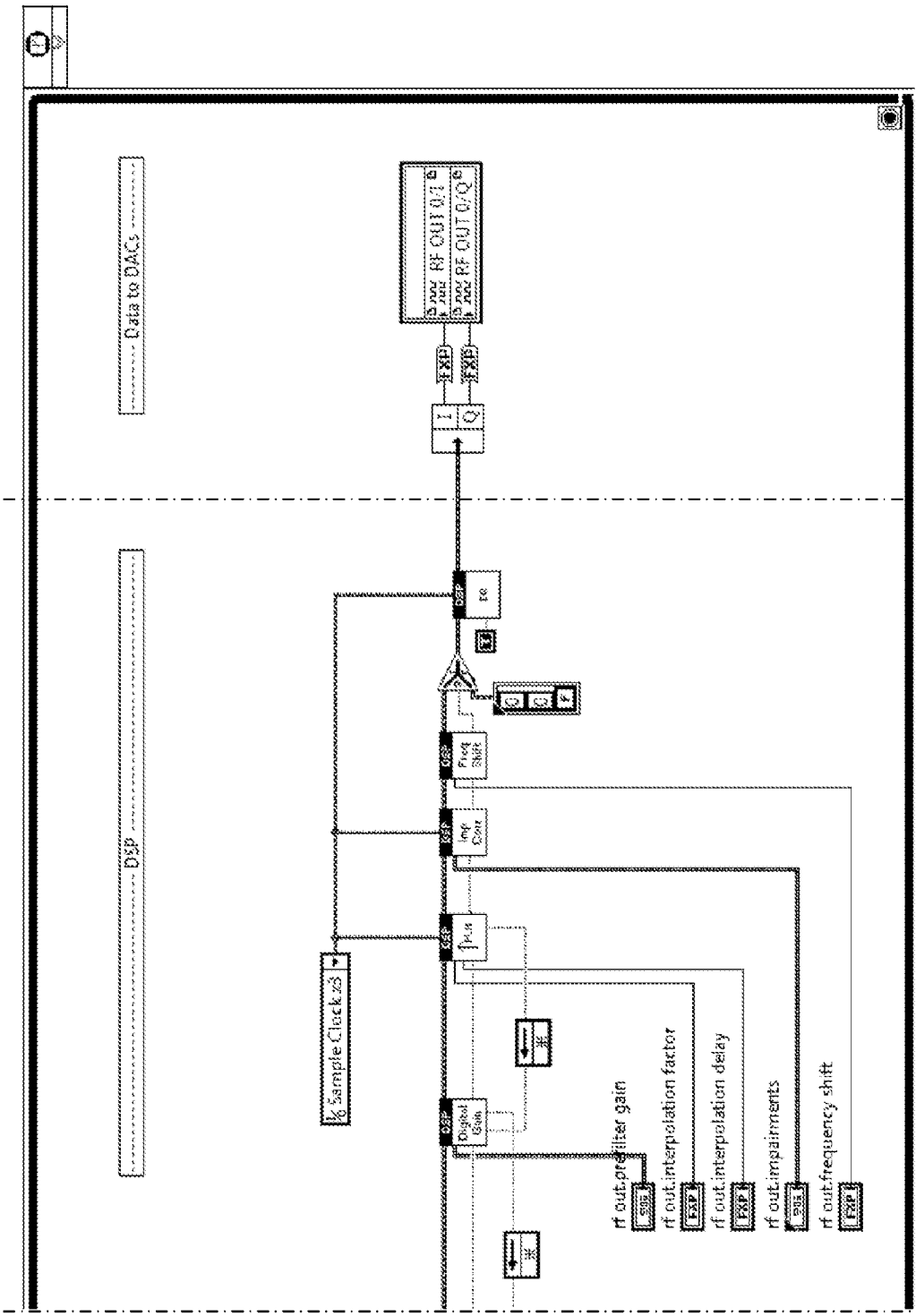
Figures 17E, 17F:
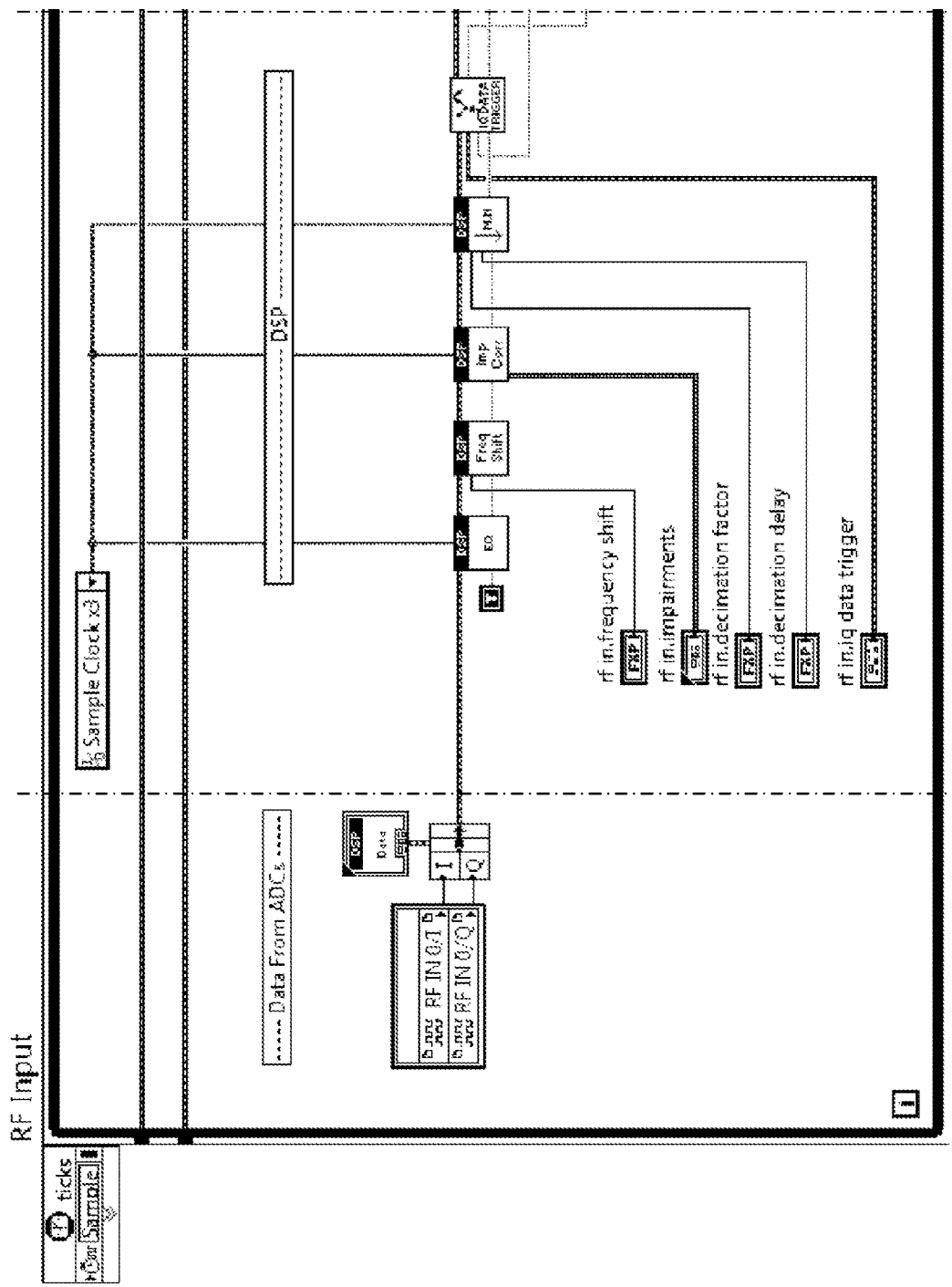
Figure 17G:
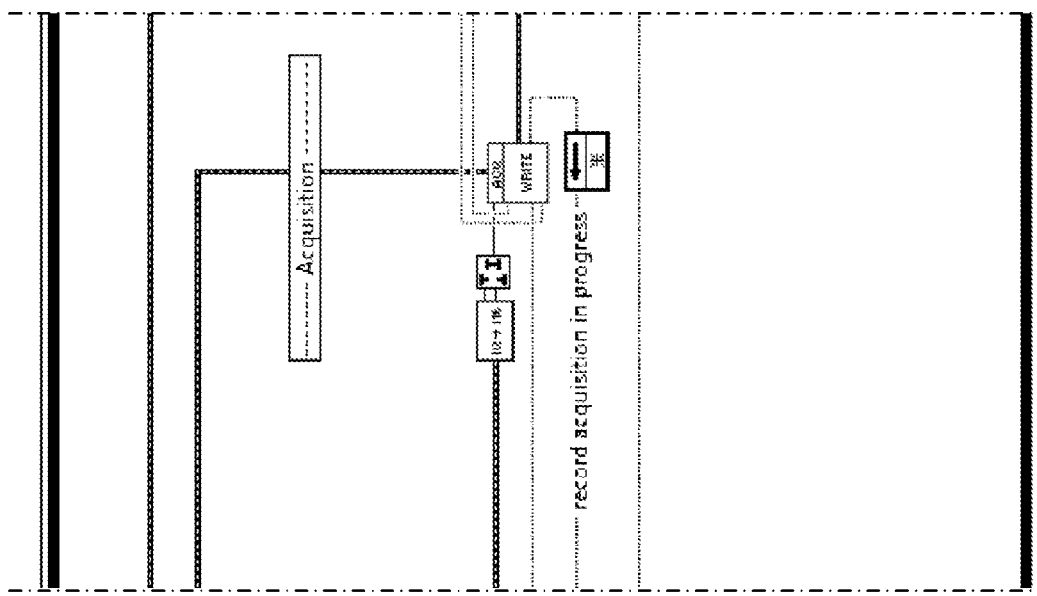
Figure 17H:
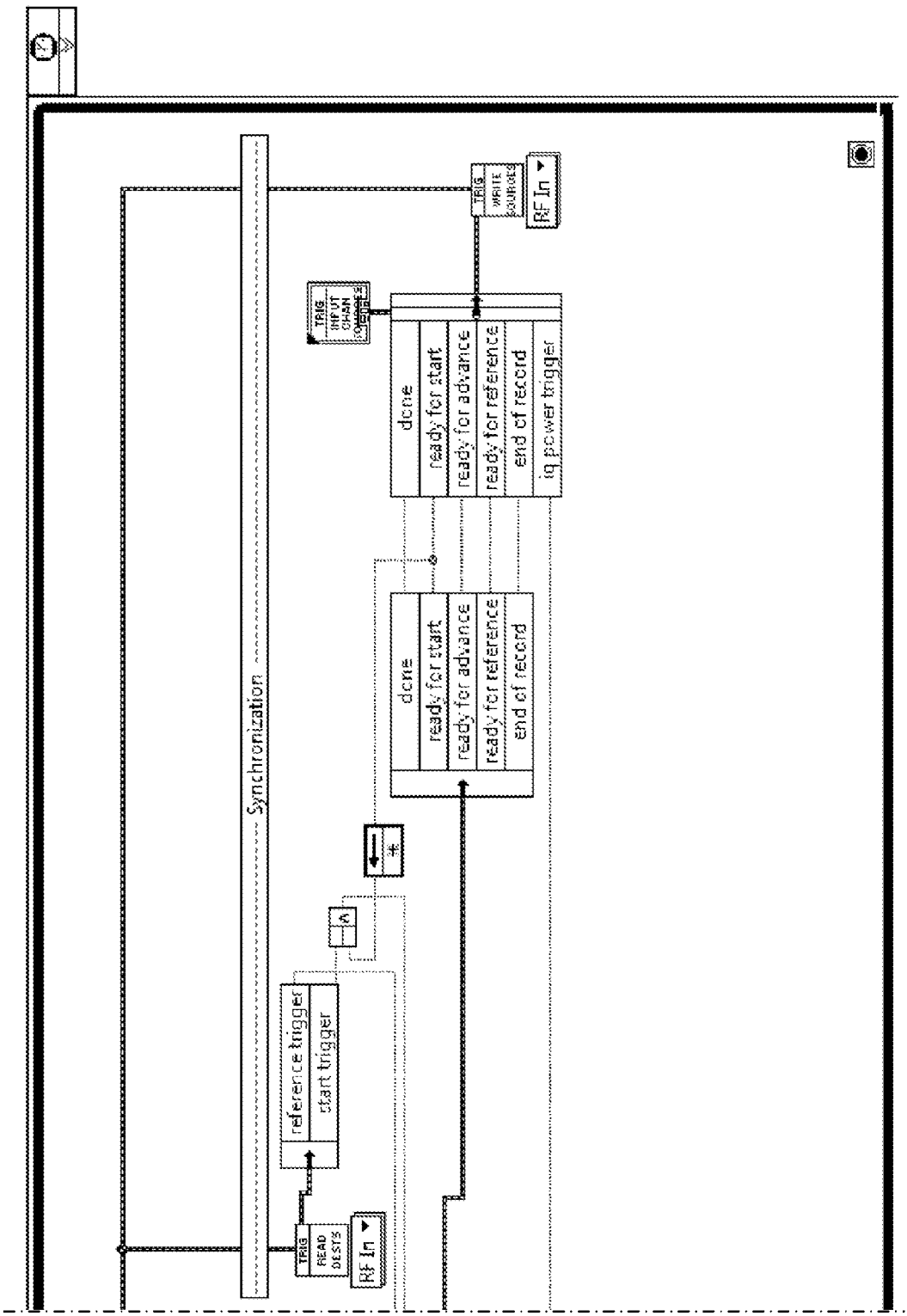
Figure 17I:
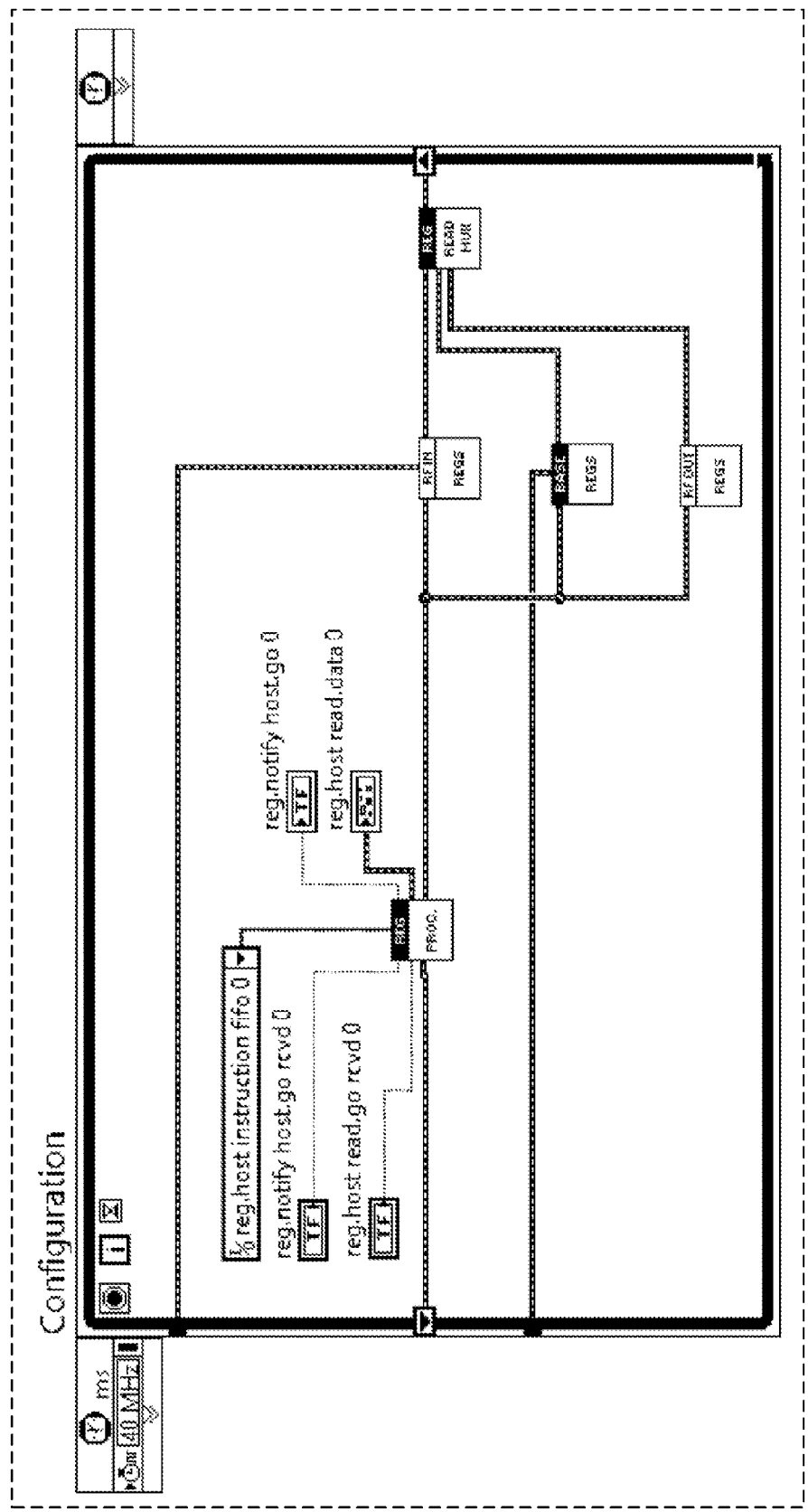

FIG. 17A corresponds to generation, e.g., fetching waveform(s) from memory, modifying depending on state of the device, etc. FIGS. 17B and 17H illustrate the portion of the graphical program which performs synchronization, e.g., selecting trigger sources. FIGS. 17C and 17F correspond to DSP, e.g., digital gain, frequency shift, rate change, equalization, etc. FIG. 17D corresponds to data transmission, e.g., sending data to the DACs, and FIG. 17E corresponds to receiving data from the ADCs. FIG. 17G corresponds to acquisition, e.g. capturing waveform(s) into memory. FIG. 17I corresponds to configuration, e.g. configuring the center frequency and power level.

Figures 18A, 18B:
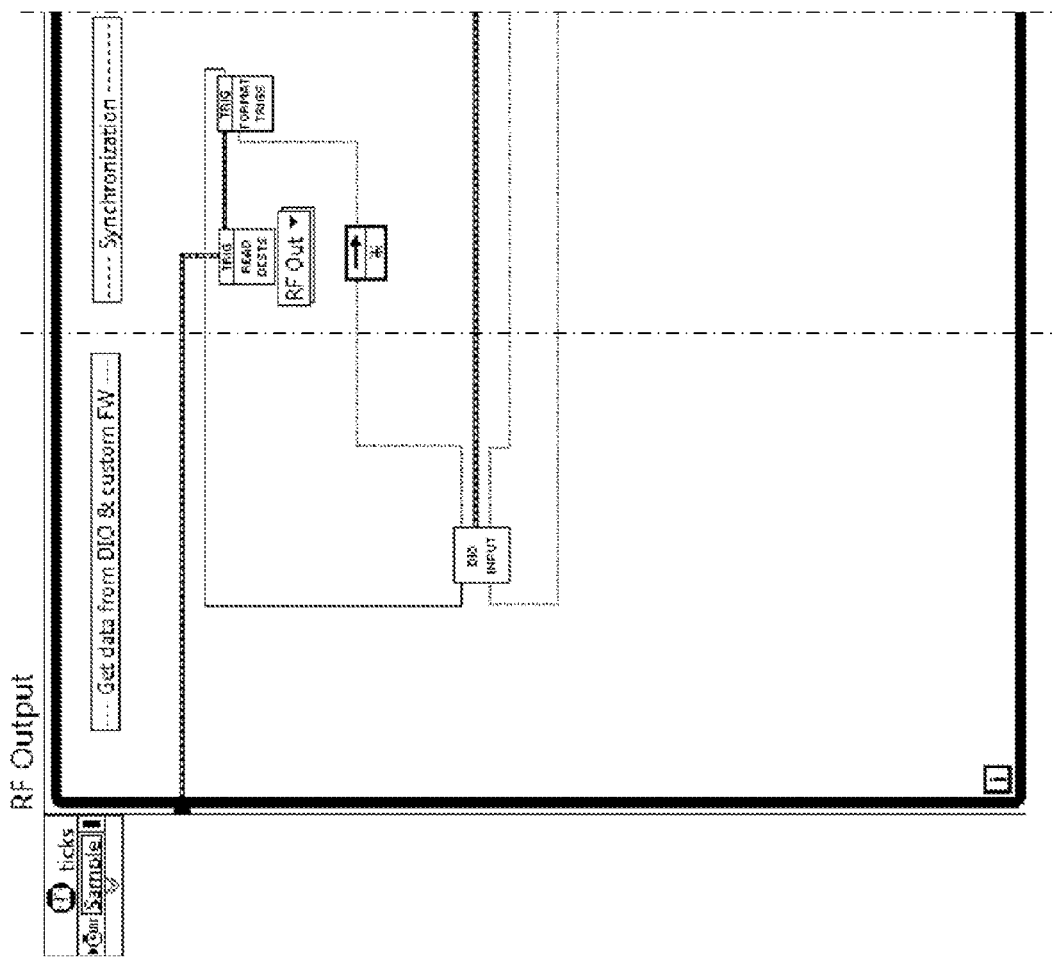
Figures 18C, 18D:
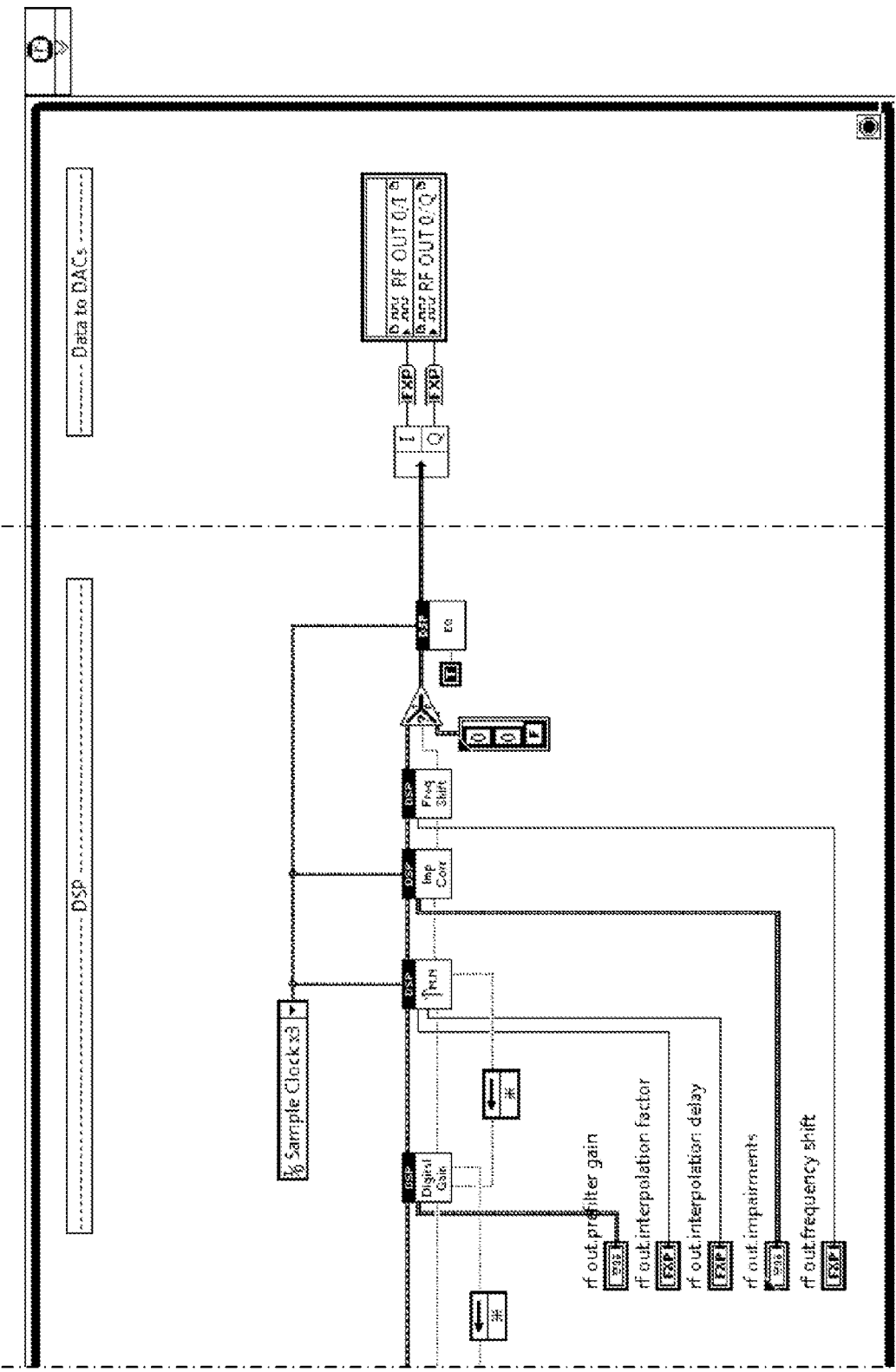

FIGS. 18A-18H illustrate the graphical program of FIGS. 17A-17I, except that the acquisition and generation pieces have been removed and the synchronization pieces have been modified, but the DSP, DAC, and ADC code is the same. In this example, FIG. 18A corresponds to custom code for sampling data from DIO port and storing the data in a FIFO. FIG. 18B corresponds to custom to the modified synchronization code. FIG. 18C corresponds to DSP and FIG. 18D corresponds to data transmission, similar to FIGS. 17C and 17D discussed above.

Figures 18E, 18F:
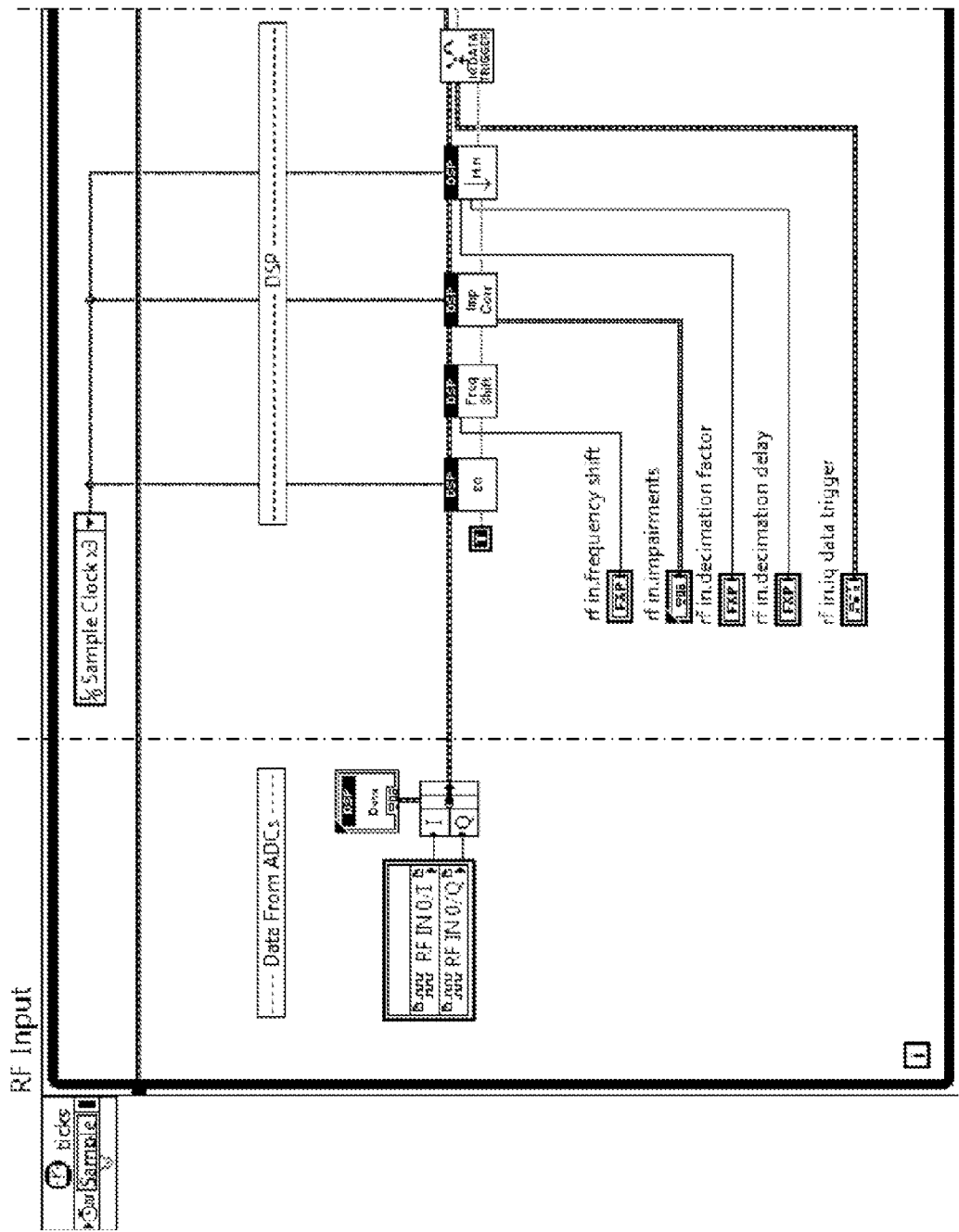
Figures 18G, 18H:
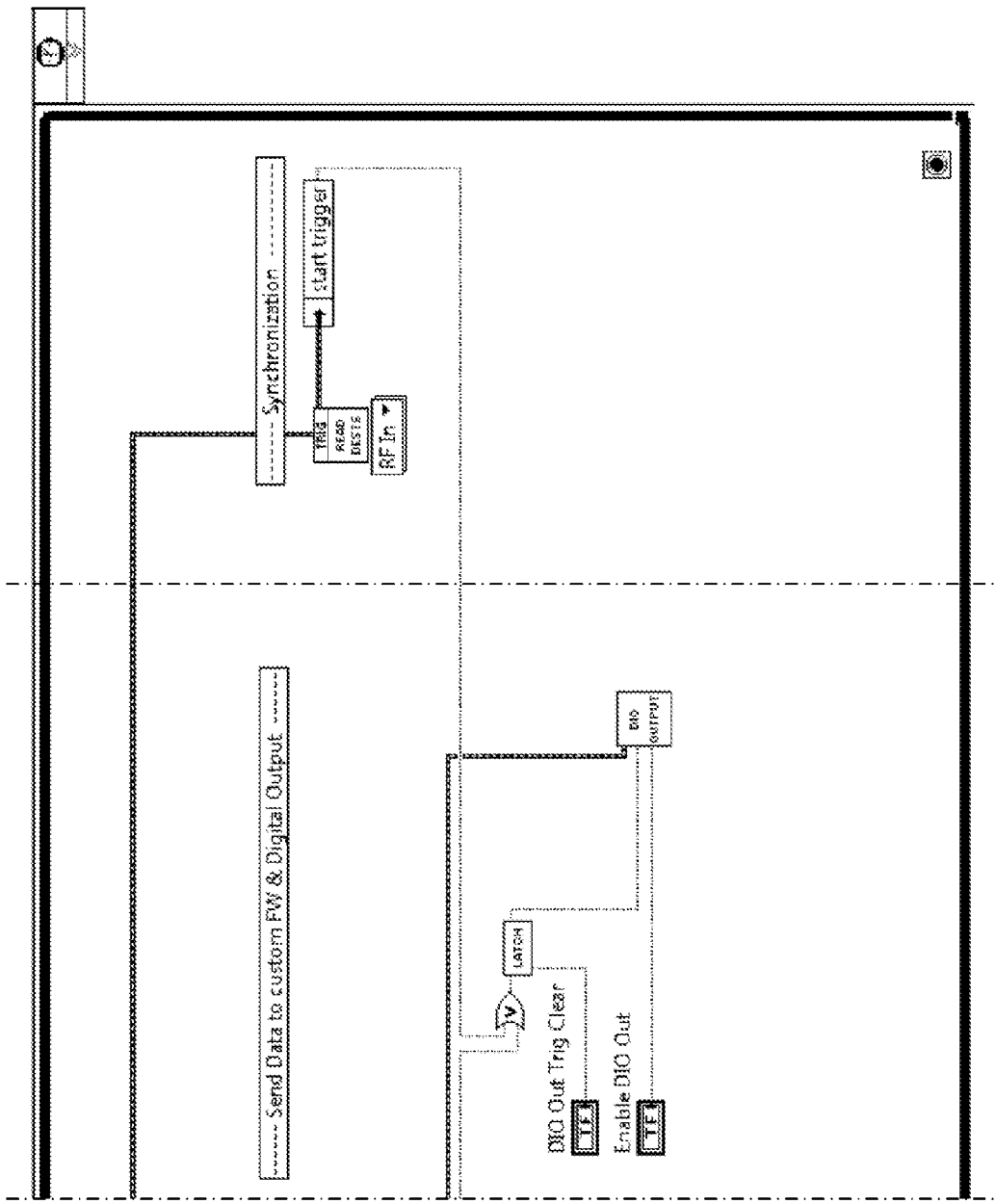

FIG. 18E corresponds to receiving data from the ADCs and FIG. 18F corresponds to DSP, similar to FIGS. 17E and 17F discussed above. FIG. 18H corresponds to the modified synchronization code. FIG. 18G corresponds to sending the waveform data out through the digital I/O outputs.

Further Embodiments

While the above embodiments have been described with respect to test instruments and testing SUTs, they may be extended to configuration or customization of any devices or instruments. Thus, the above described embodiments are not limited to the particular environments and examples discussed above and may be applied to any appropriate systems, as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for customizing a test instrument, comprising: utilizing a computer to perform:
    storing first code for execution by a processor of the test instrument;
    storing second code for implementation on a programmable hardware element of the test instrument;
    receiving user input customizing the second code prior to said storing the second code, wherein the user input specifies adaptive behavior for the test instrument based on information from a system under test (SUT);
    generating and storing a hardware description for the programmable hardware element based on the user input;
    wherein, after implementation of the hardware description on the programmable hardware element and during testing of the SUT coupled to the test instrument, the test instrument is configured to determine information received from the SUT during testing of the SUT;
    wherein operation of the test instrument is automatically modified based on the adaptive behavior specified by the user input and the information received from the SUT during testing of the SUT, wherein modification of the operation comprises one or more of:
        configuration of the test instrument; or
        configuration of the SUT.

2. The method of claim 1, wherein the first code and the second code are specified in one or more graphical program portions comprising a plurality of nodes connected by wires, wherein the plurality of nodes visually represent functionality of the one or more graphical program portions, wherein said receiving user input specifying customization comprises receiving user input modifying the one or more graphical program portions.

3. The method of claim 1, wherein the operation of the test instrument is automatically modified based on a characteristic of a signal received from the SUT.

4. The method of claim 1, wherein the operation of the test instrument is automatically modified based on content of a signal received from the SUT.

5. The method of claim 1, wherein modification of the operation further comprises one or more of:
    modification of processing of signals received from the SUT; or
    modification of signals sent to the SUT.

6. A method for customizing a test instrument, comprising: utilizing a computer to perform:
    providing a configuration for a test instrument, wherein the configuration comprises first code for execution by a processor of the test instrument and second code for implementation on a programmable hardware element of the test instrument;
    receiving user input customizing the configuration for the test instrument, wherein the user input specifies modification to the second code, wherein the modification to the second code specifies adaptive behavior for the test instrument;

generating and storing a hardware description for the programmable hardware element based on the configuration and the user input, wherein, after implementation of the hardware description on the programmable hardware element, the test instrument is configured to:

receive information from the system under test (SUT) coupled to the test instrument; and automatically modify operation of the test instrument based on the information, wherein said automatically modifying comprises performing the adaptive behavior specified by the user input customizing the configuration for the test instrument, including one or more of:

configuring the test instrument; or configuring the SUT.

7. The method of claim 6, wherein the configuration comprises a plurality of pairs of code modules, wherein each pair of code modules comprises a first code module having program instructions for execution by a processor of the test instrument and a second code module for implementation on a programmable hardware element of the test instrument, wherein, for each pair of code modules, the first code module and the second code module collectively implement a function in the test instrument, wherein the first code module of a pair of code modules is executable on the processor to perform a first portion of a function, and wherein the second code module of the pair of code modules is configured to be implemented on the programmable hardware element to perform a corresponding second portion of the function.

8. The method of claim 6, wherein the configuration is specified in one or more graphical program portions comprising a plurality of nodes connected by wires, wherein the plurality of nodes visually represent functionality of the one or more graphical program portions, wherein said receiving user input specifying customization comprises receiving user input modifying the one or more graphical program portions.

9. The method of claim 6, wherein the information comprises a characteristic of a signal received from the SUT, wherein said automatically modifying is performed based on the characteristic.

10. The method of claim 6, wherein said receiving information from the SUT comprises:

receiving a signal from the SUT; and determining the information by analyzing content of the signal received from the SUT;

wherein said automatically modifying is based on the content of the signal.

11. A non-transitory, computer accessible memory medium storing program instructions for customizing a test instrument, wherein the program instructions are executable by a computer processor to:

provide first code for execution by a processor of the test instrument;

provide second code for implementation on a programmable hardware element of the test instrument;

receive user input customizing the second code prior to said storing the second code, wherein the user input specifies the adaptive behavior for the test instrument;

generate and store a hardware description for the programmable hardware element based on the user input;

wherein, after implementation of the hardware description on the programmable hardware element and during testing of a system under test (SUT) coupled to the test instrument, the test instrument is configured to determine information received from the SUT during testing of the SUT;

wherein operation of the test instrument is automatically modified based on the information received from the SUT during testing of the SUT according to the adaptive behavior specified by the user input, wherein modification of the operation comprises one or more of:

configuration of the test instrument; or configuration of the SUT.

12. The non-transitory, computer accessible memory medium of claim 11, wherein the first code and the second code are specified in one or more graphical program portions comprising a plurality of nodes connected by wires, wherein the plurality of nodes visually represent functionality of the one or more graphical program portions, wherein said receiving user input specifying customization comprises receiving user input modifying the one or more graphical program portions.

13. The non-transitory, computer accessible memory medium of claim 11, wherein the operation of the test instrument is automatically modified based on a characteristic of a signal received from the SUT.

14. The non-transitory, computer accessible memory medium of claim 11, wherein the operation of the test instrument is automatically modified based on content of a signal received from the SUT.

15. The non-transitory, computer accessible memory medium of claim 11, wherein modification of the operation further comprises one or more of:

modification of processing of signals received from the SUT; or modification of signals sent to the SUT.

16. A non-transitory, computer accessible memory medium storing program instructions for customizing a test instrument, wherein the program instructions are executable by a computer processor to:

provide a first configuration for a test instrument, wherein the first configuration comprises first code for execution by a processor of the test instrument and second code for implementation on a programmable hardware element of the test instrument based on information from a system under test (SUT);

receive user input customizing the first configuration for the test instrument, wherein the user input specifies modification to the second code, wherein the modification to the second code specifies adaptive behavior for the test instrument;

generate and store a hardware description for the programmable hardware element based on the first configuration and the user input, wherein, after implementation of the hardware description on the programmable hardware element, the test instrument is configured to:

receive information from the SUT coupled to the test instrument during testing of the SUT; and automatically modify operation of the test instrument based on the information, wherein said automatically modifying comprises performing the adaptive behavior specified by the user input customizing the first configuration for the test instrument, including one or more of:

configuring the test instrument; or configuring the SUT.

17. The non-transitory, computer accessible memory medium of claim 16, wherein the first configuration comprises a plurality of pairs of code modules, wherein each pair of code modules comprises a first code module having program instructions for execution by a processor of the test instrument and a second code module for implementation on a programmable hardware element of the test instrument, wherein, for each pair of code modules, the first code module and the second code module collectively implement a function in the test instrument, wherein the first code module of a pair of code modules is executable on the processor to perform a first portion of a function, and wherein the second code module of the pair of code modules is configured to be implemented on the programmable hardware element to perform a corresponding second portion of the function.

18. The non-transitory, computer accessible memory medium of claim 16, wherein the first configuration is specified in one or more graphical program portions comprising a plurality of nodes connected by wires, wherein the plurality of nodes visually represent functionality of the one or more graphical program portions, wherein said receiving user input specifying customization comprises receiving user input modifying the one or more graphical program portions.

19. The non-transitory, computer accessible memory medium of claim 16, wherein the information comprises a characteristic of a signal received from the SUT, wherein said automatically modifying is performed based on the characteristic.

20. The non-transitory, computer accessible memory medium of claim 16, wherein said receiving information from the SUT comprises:
  receiving a signal from the SUT; and
  determining the information by analyzing content of the signal received from the SUT;
  wherein said automatically modifying is based on the content of the signal.

21. A method for customizing a test instrument, comprising:
  utilizing a computer to perform:
    storing first code for execution by a processor of the test instrument;
    storing second code for implementation on a programmable hardware element of the test instrument, wherein the second code specifies adaptive behavior for the test instrument based on information received from a system under test; and
    generating a hardware description for the programmable hardware element based on the second code;
  implementing the hardware description on the programmable hardware element;
  operating the test instrument to test the SUT coupled to the test instrument, wherein said operating comprises the processor executing the first code and the programmable hardware element performing functionality specified by the hardware description;
  determining, by the test instrument, information received from the SUT during the test instrument operating to test the SUT; and
  automatically modifying operation of the test instrument based on the information received from the DUT during the test instrument operating to test the SUT, including one or more of:
    configuring the test instrument; or
    configuring the SUT;
  wherein the test instrument continues operating to test the SUT after said automatically modifying operation.

22. A test instrument, comprising:
  a processor;
  a non-transitory computer readable memory medium coupled to the processor, wherein the memory medium stores program instructions that are executable by the processor to implement first functionality of the test instrument;
  a programmable hardware element coupled to the processor, wherein the programmable hardware element is configured to implement second functionality of the test instrument;
  one or more input and output ports for communicating with a system under test (SUT);
  wherein the processor and memory medium and the programmable hardware element are configured to:
    receive information from a SUT coupled to the test instrument; and
    automatically modify operation of the test instrument based on the information, including one or more of:
      configuring the test instrument; or
      configuring the SUT.

* * * * *